(12) United States Patent
Primm et al.

(10) Patent No.: US 7,529,838 B2
(45) Date of Patent: *May 5, 2009

(54) METHOD AND SYSTEM FOR A SET OF NETWORK APPLIANCES WHICH CAN BE CONNECTED TO PROVIDE ENHANCED COLLABORATION, SCALABILITY, AND RELIABILITY

(75) Inventors: Michael Primm, Austin, TX (US); John J. Fowler, Austin, TX (US); Gary Faulkner, Austin, TX (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/548,398

(22) Filed: Oct. 11, 2006

(65) Prior Publication Data

US 2007/0220141 A1    Sep. 20, 2007

Related U.S. Application Data

(63) Continuation of application No. 10/057,563, filed on Jan. 25, 2002, now Pat. No. 7,159,022.

(60) Provisional application No. 60/264,445, filed on Jan. 26, 2001.

(51) Int. Cl.
*G06F 15/173* (2006.01)
(52) U.S. Cl. ....................................... 709/226; 709/228
(58) Field of Classification Search ................. 709/226, 709/228
See application file for complete search history.

(56) References Cited

U.S. PATENT DOCUMENTS 3,810,138 A    5/1974   Thompson et al.

(Continued)

FOREIGN PATENT DOCUMENTS

AU    3855395 A1    6/1996

(Continued)

OTHER PUBLICATIONS

Axis Communications, "Axis 2400/2401 Administration Manual Version 1.1", www.axis.com/techsup/cam_2400/index.htm, version 1.1xx, part No. 16741, pp. 1-78, Jul. 1999.

(Continued)

*Primary Examiner*—Patrice Winder
(74) *Attorney, Agent, or Firm*—Lowrie, Lando & Anastasi, LLP

(57) ABSTRACT

The invention is directed to a network-enabled appliance. The appliance may aid the remote monitoring of various measured data. The device may monitor a variable or set of variables and output the data upon request. In addition, the appliance may issue alarms, alerts, warning and other notifications when a variable matches a setpoint or undergoes a specified change, deviation, and/or fluctuation. Further the appliance may be operable to communicate with other appliances. The communication may comprise periodic pinging of peer appliances. In this manner, a peer appliance may detect a failure in other network-enabled appliances when an anticipated ping is not received. Further, the communication may enable the establishment of a directory of capabilities of various appliances. In this manner, a group of appliances may perform more complex behaviors by grouping resources. Further, a group of appliances may act to reestablish the behavior of a failed device.

20 Claims, 9 Drawing Sheets

U.S. PATENT DOCUMENTS

| | | | |
|---|---|---|---|
| 4,349,879 A | 9/1982 | Peddie et al. | |
| 4,521,645 A | 6/1985 | Carroll | |
| 4,568,934 A | 2/1986 | Allgood | |
| 4,636,652 A | 1/1987 | Raes | |
| 4,637,020 A | 1/1987 | Schinabeck | |
| 4,650,347 A | 3/1987 | Shigemura et al. | |
| 4,668,939 A | 5/1987 | Kimura et al. | |
| 4,718,025 A | 1/1988 | Minor et al. | |
| 4,747,041 A | 5/1988 | Engel et al. | |
| 4,751,648 A | 6/1988 | Sears, III et al. | |
| 4,816,208 A | 3/1989 | Woods et al. | |
| 4,823,290 A | 4/1989 | Fasack et al. | |
| 4,964,065 A | 10/1990 | Hicks et al. | |
| 5,043,807 A | 8/1991 | Rabii | |
| 5,061,916 A | 10/1991 | French et al. | |
| 5,086,385 A | 2/1992 | Launey et al. | |
| 5,097,328 A | 3/1992 | Boyette | |
| 5,109,278 A | 4/1992 | Erickson et al. | |
| 5,153,837 A | 10/1992 | Shaffer et al. | |
| 5,157,732 A | 10/1992 | Ishii et al. | |
| 5,189,394 A | 2/1993 | Walter et al. | |
| 5,216,623 A | 6/1993 | Barrett et al. | |
| 5,220,522 A | 6/1993 | Wilson et al. | |
| 5,225,997 A | 7/1993 | Lederer et al. | |
| 5,229,850 A | 7/1993 | Toyoshima | |
| 5,262,758 A | 11/1993 | Nam et al. | |
| 5,289,275 A | 2/1994 | Ishii et al. | |
| 5,367,670 A | 11/1994 | Ward et al. | |
| 5,382,943 A | 1/1995 | Tanaka | |
| 5,395,042 A | 3/1995 | Riley et al. | |
| 5,400,246 A | 3/1995 | Wilson et al. | |
| 5,404,136 A | 4/1995 | Marsden | |
| 5,475,364 A | 12/1995 | Kenet | |
| 5,488,430 A | 1/1996 | Hong | |
| 5,491,511 A | 2/1996 | Odle | |
| 5,508,941 A | 4/1996 | Leplingard et al. | |
| 5,528,507 A | 6/1996 | McNamara et al. | |
| 5,548,659 A | 8/1996 | Okamoto | |
| 5,553,609 A | 9/1996 | Chen et al. | |
| 5,561,476 A | 10/1996 | Kershaw et al. | |
| 5,566,339 A | 10/1996 | Perholtz et al. | |
| 5,572,195 A | 11/1996 | Heller et al. | |
| 5,581,478 A | 12/1996 | Cruse et al. | |
| 5,586,202 A | 12/1996 | Ohki et al. | |
| 5,588,067 A | 12/1996 | Peterson et al. | |
| 5,589,764 A | 12/1996 | Lee | |
| 5,602,585 A | 2/1997 | Dickinson et al. | |
| 5,621,662 A | 4/1997 | Humphries et al. | |
| 5,634,002 A | 5/1997 | Polk et al. | |
| 5,659,470 A | 8/1997 | Goska et al. | |
| 5,664,202 A | 9/1997 | Chen et al. | |
| 5,715,160 A | 2/1998 | Plotke | |
| 5,731,832 A | 3/1998 | Ng | |
| 5,732,074 A | 3/1998 | Spaur et al. | |
| 5,742,762 A | 4/1998 | Scholl et al. | |
| RE35,793 E | 5/1998 | Halpern | |
| 5,768,430 A | 6/1998 | Takashima et al. | |
| 5,798,798 A | 8/1998 | Rector et al. | |
| 5,805,458 A | 9/1998 | McNamara et al. | |
| 5,812,055 A | 9/1998 | Candy et al. | |
| 5,818,725 A | 10/1998 | McNamara et al. | |
| 5,822,302 A | 10/1998 | Landry, Jr. et al. | |
| 5,829,130 A | 11/1998 | Miller | |
| 5,870,698 A | 2/1999 | Riedel et al. | |
| 5,892,440 A | 4/1999 | Bryan | |
| 5,905,867 A | 5/1999 | Giorgio et al. | |
| 5,926,210 A | 7/1999 | Hackett et al. | |
| 5,937,092 A | 8/1999 | Wootton et al. | |
| 5,937,097 A | 8/1999 | Lennon | |
| 5,949,974 A | 9/1999 | Ewing et al. | |
| 5,955,946 A | 9/1999 | Beheshti et al. | |
| 5,963,457 A | 10/1999 | Kanoi et al. | |
| 5,968,116 A | 10/1999 | Day, II et al. | |
| 5,974,237 A | 10/1999 | Shurmer et al. | |
| 5,978,594 A | 11/1999 | Bonnell et al. | |
| 5,978,912 A | 11/1999 | Rakavy et al. | |
| 5,987,614 A | 11/1999 | Mitchell et al. | |
| 5,991,885 A | 11/1999 | Chang et al. | |
| 6,001,065 A | 12/1999 | DeVito | |
| 6,052,750 A | 4/2000 | Lea | |
| 6,055,480 A | 4/2000 | Nevo et al. | |
| 6,057,834 A | 5/2000 | Pickover | |
| 6,058,434 A | 5/2000 | Wilt et al. | |
| 6,078,253 A | 6/2000 | Fowler | |
| 6,078,957 A * | 6/2000 | Adelman et al. | ............ 709/224 |
| 6,081,606 A | 6/2000 | Hansen et al. | |
| 6,085,243 A | 7/2000 | Fletcher et al. | |
| 6,088,816 A | 7/2000 | Nouri et al. | |
| 6,094,676 A | 7/2000 | Gray | |
| 6,100,806 A | 8/2000 | Gaukel | |
| 6,104,755 A | 8/2000 | Ohara | |
| 6,105,061 A | 8/2000 | Nakai | |
| 6,108,782 A | 8/2000 | Fletcher et al. | |
| 6,112,235 A | 8/2000 | Spofford | |
| 6,115,468 A | 9/2000 | De Nicolo | |
| 6,122,603 A | 9/2000 | Budike, Jr. | |
| 6,122,639 A | 9/2000 | Babu et al. | |
| 6,125,145 A | 9/2000 | Koyanagi et al. | |
| 6,138,078 A | 10/2000 | Canada et al. | |
| 6,138,249 A | 10/2000 | Nolet | |
| 6,139,177 A | 10/2000 | Venkatraman et al. | |
| 6,144,770 A | 11/2000 | Lennon | |
| 6,148,262 A | 11/2000 | Fry | |
| 6,157,943 A | 12/2000 | Meyer | |
| 6,160,584 A | 12/2000 | Yanagita | |
| 6,160,926 A | 12/2000 | Dow et al. | |
| 6,167,406 A | 12/2000 | Hoskins et al. | |
| 6,170,007 B1 | 1/2001 | Venkatraman et al. | |
| 6,173,323 B1 | 1/2001 | Moghe | |
| 6,175,866 B1 | 1/2001 | Holloway et al. | |
| 6,175,927 B1 | 1/2001 | Cromer et al. | |
| 6,177,884 B1 | 1/2001 | Hunt et al. | |
| 6,182,094 B1 | 1/2001 | Humpleman et al. | |
| 6,182,157 B1 | 1/2001 | Schlener et al. | |
| 6,189,109 B1 | 2/2001 | Sheikh et al. | |
| 6,195,018 B1 | 2/2001 | Ragle et al. | |
| 6,208,261 B1 | 3/2001 | Olstead | |
| 6,208,345 B1 | 3/2001 | Sheard et al. | |
| 6,215,404 B1 | 4/2001 | Morales | |
| 6,216,956 B1 | 4/2001 | Ehlers et al. | |
| 6,219,628 B1 | 4/2001 | Kodosky et al. | |
| 6,229,429 B1 | 5/2001 | Horon | |
| 6,236,332 B1 | 5/2001 | Conkright et al. | |
| 6,246,780 B1 | 6/2001 | Sato | |
| 6,259,956 B1 | 7/2001 | Myers et al. | |
| 6,266,721 B1 | 7/2001 | Sheikh et al. | |
| 6,271,845 B1 | 8/2001 | Richardson | |
| 6,281,790 B1 | 8/2001 | Kimmel et al. | |
| 6,282,546 B1 | 8/2001 | Gleichauf et al. | |
| 6,298,144 B1 | 10/2001 | Pucker, II et al. | |
| 6,304,900 B1 | 10/2001 | Cromer | |
| 6,311,105 B1 | 10/2001 | Budike, Jr. | |
| 6,311,214 B1 | 10/2001 | Rhoads | |
| 6,324,644 B1 | 11/2001 | Rakavy et al. | |
| 6,329,792 B1 | 12/2001 | Dunn et al. | |
| 6,332,202 B1 | 12/2001 | Sheikh et al. | |
| 6,338,094 B1 | 1/2002 | Scott et al. | |
| 6,343,320 B1 | 1/2002 | Fairchild et al. | |
| 6,360,255 B1 | 3/2002 | McCormack et al. | |
| 6,363,421 B2 | 3/2002 | Barker et al. | |
| 6,363,422 B1 | 3/2002 | Hunter et al. | |
| 6,373,840 B1 | 4/2002 | Chen | |
| 6,374,296 B1 | 4/2002 | Lim et al. | |
| 6,375,614 B1 | 4/2002 | Braun et al. | |

| | | | | | | |
|---|---|---|---|---|---|---|
| 6,381,700 B1 | 4/2002 | Yoshida | | EP | 0956680 A1 | 11/1999 |
| 6,389,464 B1 | 5/2002 | Krishnamurthy et al. | | EP | 1014622 A2 | 12/1999 |
| 6,396,534 B1 | 5/2002 | Mahler et al. | | EP | 0990986 A | 4/2000 |
| 6,400,103 B1 | 6/2002 | Adamson | | EP | 0992100 | 4/2000 |
| 6,400,996 B1 | 6/2002 | Hoffberg et al. | | EP | 1002268 A1 | 5/2000 |
| 6,402,691 B1 | 6/2002 | Peddicord et al. | | EP | 1009130 A | 6/2000 |
| 6,404,348 B1 | 6/2002 | Wilfong | | EP | 1032884 A1 | 9/2000 |
| 6,405,216 B1 | 6/2002 | Minnaert et al. | | EP | 1049291 A2 | 11/2000 |
| 6,449,745 B1 | 9/2002 | Kim et al. | | EP | 1115264 A2 | 12/2000 |
| 6,477,667 B1 | 11/2002 | Levi et al. | | EP | 1124301 A2 | 12/2000 |
| 6,496,105 B2 | 12/2002 | Fisher et al. | | EP | 1096724 | 5/2001 |
| 6,505,086 B1 | 1/2003 | Dodd, Jr. et al. | | EP | 1 107 519 A * | 6/2001 |
| 6,510,350 B1 | 1/2003 | Steen, III et al. | | EP | 1150188 A2 | 10/2001 |
| 6,529,230 B1 | 3/2003 | Chong | | EP | 1142289 A1 | 12/2001 |
| 6,529,936 B1 | 3/2003 | Mayo et al. | | EP | 1178628 A2 | 2/2002 |
| 6,553,336 B1 | 4/2003 | Johnson et al. | | GB | 9826895 A | 1/1999 |
| 6,553,418 B1 | 4/2003 | Collins et al. | | GB | 9913682 A | 8/1999 |
| 6,591,279 B1 | 7/2003 | Emens et al. | | GB | 2335124 A | 9/1999 |
| 6,611,866 B1 | 8/2003 | Goldman | | GB | 2343036 A | 4/2000 |
| 6,640,145 B2 | 10/2003 | Hoffberg et al. | | GB | 2344718 A | 6/2000 |
| 6,658,595 B1 * | 12/2003 | Thamattoor ............. 714/11 | | GB | 2351205 A | 12/2000 |
| 6,681,787 B2 | 1/2004 | Tinsley et al. | | GB | 2344718 B | 1/2001 |
| 6,686,838 B1 | 2/2004 | Rezvani et al. | | GB | 2355163 A | 4/2001 |
| 6,714,977 B1 | 3/2004 | Fowler et al. | | GB | 2359369 A | 8/2001 |
| 6,718,364 B2 | 4/2004 | Connelly et al. | | HU | 9300145 U0 | 8/1993 |
| 6,756,998 B1 | 6/2004 | Bilger | | JP | 3099398 A2 | 4/1991 |
| 6,801,940 B1 | 10/2004 | Moran et al. | | JP | 5040889 A2 | 2/1993 |
| 6,829,630 B1 | 12/2004 | Pajak et al. | | JP | 6105376 A2 | 4/1994 |
| 6,990,513 B2 | 1/2006 | Belfiore et al. | | JP | 6119581 A2 | 4/1994 |
| 7,051,096 B1 | 5/2006 | Krawiec et al. | | JP | 8307541 A2 | 11/1996 |
| 7,159,022 B2 | 1/2007 | Primm et al. | | JP | 11164035 A2 | 6/1999 |
| 7,207,041 B2 | 4/2007 | Elson et al. | | JP | 11219388 | 8/1999 |
| 2001/0005894 A1 | 6/2001 | Fukui | | JP | 11338666 | 12/1999 |
| 2001/0047213 A1 | 11/2001 | Sepe, Jr. | | JP | 2000092092 A2 | 3/2000 |
| 2001/0047410 A1 | 11/2001 | Defosse | | JP | 2000134606 A2 | 5/2000 |
| 2001/0052006 A1 | 12/2001 | Barker et al. | | JP | 2000151606 A2 | 5/2000 |
| 2001/0055965 A1 | 12/2001 | Delp et al. | | JP | 2000209204 A2 | 7/2000 |
| 2002/0003575 A1 | 1/2002 | Marchese | | JP | 2000278773 A2 | 10/2000 |
| 2002/0023258 A1 | 2/2002 | Elwahab et al. | | TW | 0443058 B | 6/2001 |
| 2002/0041603 A1 | 4/2002 | Kato | | TW | 0448349 B | 8/2001 |
| 2002/0043969 A1 | 4/2002 | Duncan et al. | | WO | 9521506 | 8/1995 |
| 2002/0071031 A1 | 6/2002 | Lord et al. | | WO | 9615615 | 5/1996 |
| 2002/0072868 A1 | 6/2002 | Bartone et al. | | WO | 9730879 | 9/1997 |
| 2002/0083378 A1 | 6/2002 | Nickels | | WO | 9801838 | 1/1998 |
| 2002/0112054 A1 * | 8/2002 | Hatanaka .................. 709/225 | | WO | 9826541 | 6/1998 |
| 2002/0124081 A1 | 9/2002 | Primm et al. | | WO | 9908183 | 2/1999 |
| 2002/0152298 A1 | 10/2002 | Kikta et al. | | WO | 9915950 | 4/1999 |
| 2002/0161885 A1 | 10/2002 | Childers et al. | | WO | 9927456 | 6/1999 |
| 2002/0174223 A1 | 11/2002 | Childers et al. | | WO | 9945445 | 9/1999 |
| 2003/0098789 A1 | 5/2003 | Murakami et al. | | WO | 0035177 | 6/2000 |
| 2003/0204756 A1 | 10/2003 | Ransom et al. | | WO | 0039724 | 7/2000 |
| | | | | WO | 0054557 | 9/2000 |
| | FOREIGN PATENT DOCUMENTS | | | WO | 0073866 A1 | 12/2000 |
| | | | | WO | 0079500 A1 | 12/2000 |
| AU | 5601198 A1 | 7/1998 | | WO | 0101366 A2 | 1/2001 |
| AU | 0016673 A5 | 6/2000 | | WO | 0108396 | 2/2001 |
| CA | 2300053 AA | 2/1999 | | WO | 0127763 A1 | 4/2001 |
| CA | 2312075 AA | 6/1999 | | WO | 0157631 A1 | 8/2001 |
| CA | 2328939 AA | 9/1999 | | WO | 0161665 A2 | 8/2001 |
| CN | 87100353 A | 9/1988 | | WO | 0169405 A2 | 9/2001 |
| CN | 1294350 A | 5/2001 | | WO | 0169504 | 9/2001 |
| EP | 0444997 B1 | 2/1991 | | WO | 0179935 A1 | 10/2001 |
| EP | 0591585 B1 | 4/1994 | | WO | 015477 C1 | 11/2001 |
| EP | 0738065 A1 | 3/1996 | | WO | 0182028 A2 | 11/2001 |
| EP | 0744112 B1 | 11/1996 | | WO | 0193042 A2 | 12/2001 |
| EP | 0859489 A2 | 1/1998 | | WO | 0193508 A1 | 12/2001 |
| EP | 0978780 A1 | 8/1998 | | WO | 0197907 A2 | 12/2001 |
| EP | 0917034 | 10/1998 | | WO | 0199402 A2 | 12/2001 |
| EP | 0917034 B1 | 10/1998 | | WO | 0201877 A1 | 1/2002 |
| EP | 0963076 A3 | 5/1999 | | WO | 0211391 A2 | 2/2002 |
| EP | 0964551 A1 | 6/1999 | | WO | 0169405 C1 | 3/2002 |
| EP | 0927933 A2 | 7/1999 | | WO | 0233980 A2 | 4/2002 |
| EP | 0977112 A2 | 7/1999 | | WO | 0237280 A2 | 5/2002 |

| | | |
|---|---|---|
| WO | 0079500 C2 | 6/2002 |
| WO | 0247044 | 6/2002 |
| WO | 0247369 A1 | 6/2002 |
| WO | 0248830 A2 | 6/2002 |
| WO | 0249285 | 6/2002 |

OTHER PUBLICATIONS

Fossum, E.R., "CMOS Image Sensors: Electronic Camera-On-Chip", IEEE Transactions on Electron Devices, vol. 44, iss. 10, pp. 1689-1698, Oct. 1997.

Axis Communications, "Axis 200+and 240 Camera Server: User's Guide", www.axis.com/techsup/cam_servers/cam_240/index.htm, pp. 1-38, Jan. 1999.

Axis Communications, "Network Camera Developments Enable Live Web Imaging", Axis 2100 white paper, www.axis.com/products/videos/camera/documentation.htm, pp. 1-12, Nov. 1999.

Sinetica Corp., "Newsletter, Issue One 99", Sinetica, UK, www.sinetica.co.uk, Feb. 1999, XP002160504, 4 pp.

Sinetica Corp., "Netcom TH. Advanced SNMP Agent with Web Browser Support", Sinetica, UK, www.sinetica.co.uk, Apr. 2000, XP002160505, 2 pp.

International Search Report dated Sep. 4, 2002 in PCT/US02/09178.

Duran, J.W. et al. "Virtual personal computers and the portable network", IEEE Proceedings of Inter. Performance, Computing, and Communications, IPCCC'99. pp. 52-56, Feb. 1999.

International Search Report dated Aug. 22, 2002 in PCT/US02/09179.

Fossum, E.R., "CMOS Image Sensors: Electronic Camera-On-Chip", IEEE Transactions on Electron Devices, vol. 44, Issue 10, pp. 1689-1698, Oct. 1997.

\* cited by examiner

DIRECTORY

| DEVICE | SUPPORTED ACTIVITIES | DATA |
|---|---|---|
| A | TEMPERATURE SENSOR | VALUE, EMAIL LIST |
|   | AIR FLOW SENSOR | VALUE, PAGER NUMBER |
| B | CAMERA | DEVICE DATA |
| C | MOTION SENSOR | EMAIL LIST |
| D | MODEM |   |
|   | EMAIL ENABLED |   |

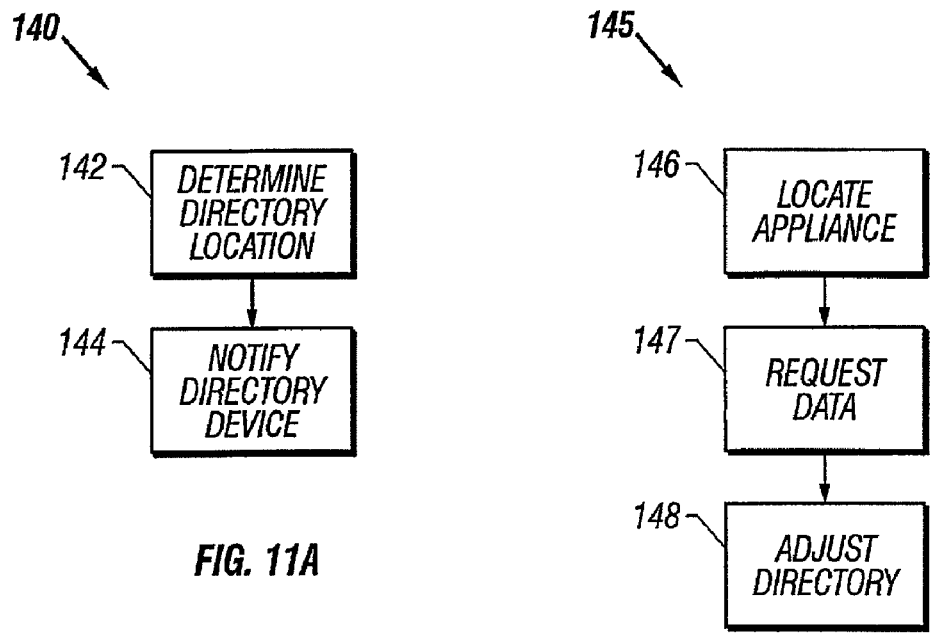
FIG. 11A
FIG. 11B
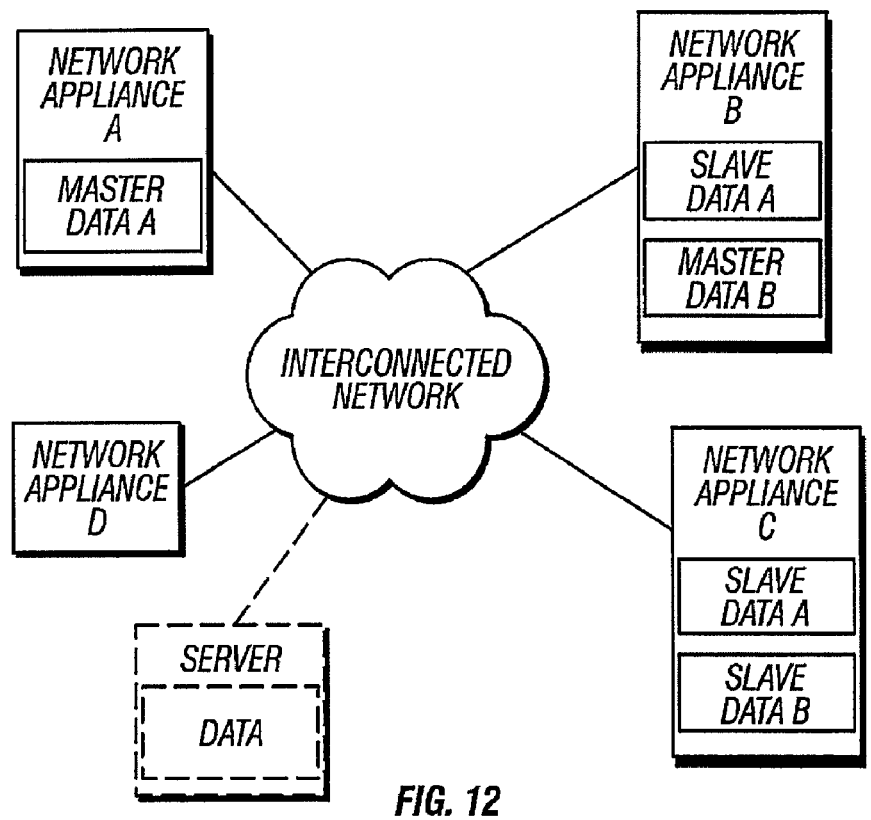
FIG. 12

METHOD AND SYSTEM FOR A SET OF NETWORK APPLIANCES WHICH CAN BE CONNECTED TO PROVIDE ENHANCED COLLABORATION, SCALABILITY, AND RELIABILITY

RELATED APPLICATIONS

This application is a continuation of prior application Ser. No. 10/057,563, filed Jan. 25, 2002, (now issued as U.S. Pat. No. 7,159,022), which is incorporated herein by reference in its entirety and which claims priority to U.S. patent application, Ser. No. 60/264,445, filed Jan. 26, 2001 entitled: "METHOD AND SYSTEM FOR A SET OF NETWORK APPLIANCES WHICH CAN BE CONNECTED TO PROVIDE ENHANCED COLLABORATION, SCALABILITY, AND RELIABILITY", ~which is also incorporated herein by reference in its entirety.

TECHNICAL FIELD OF THE INVENTION

This invention relates in general to a method and apparatus for remote monitoring of a set of sensors. More specifically, this invention relates to a method and apparatus for communication between a cluster of network enabled devices and a remote monitoring facility.

BACKGROUND OF THE INVENTION

Data traffic on networks, particularly on the Internet, has increased dramatically over the past several years, and this trend will continue with the rapid growth of e-commerce and other services on the Internet requiring greater bandwidth. With this increase in data traffic on networks, there has been a corresponding increase in the number of computer equipment rooms, known as "server rooms," used to house the equipment necessary to support data traffic routing. Furthermore, the increasing dependency of companies on their Internet presence has created an urgency to keep the server rooms up and running at all times. Industry estimates show that there are over 400,000 such rooms currently in existence in the United States.

The growth in Internet traffic has prompted many businesses to construct a server room to allow their employees to access Internet information or enable e-commerce and store data. Once viewed as a goal, continuous server up time has become a necessity. Keeping track of numerous computers, along with associated bridges, routers, backup power supplies, etc., can be a formidable task. A large company with server rooms in more than one city might well be faced with spending thousands of dollars on software packages to keep their equipment running. Prices of $1,000 per computer are common. Dedicated technicians are also needed to monitor network equipment and issue work orders to repair failed units.

While reliable, modem computer systems cannot tolerate excess heat, dust or humidity. Heat can rapidly cause equipment deterioration. Failure of cooling fans can reduce equipment lifetime to days or hours. A single high-speed LAN (local area network) failure can cause slow system response. These and other such failures within the equipment in a server room occur routinely and can cause great disruption to a business.

Solutions do currently exist for monitoring computer networks and equipment to prevent such failures. However, these solutions are primarily targeted at high-end, very large systems such as those used by large corporations or institutions that have large budgets to support equipment monitoring. For example, Hewlett-Packard provides a high-end monitoring package with a starting price of around $250,000. In the middle tier, smaller monitoring solutions can be had for approximately $20,000. Some of these systems only permit inspection of devices on a local basis. Others permit a technician to inspect geographically diverse installations from a central console. However, all of these solutions are expensive to implement and complex and difficult to maintain and train personnel to use them.

As a result, small to medium companies having small to medium networks are left in the position of requiring a means to monitor and maintain their computer network equipment from failing while not having the resources to afford the high-priced solutions currently available. Many firms cannot afford a high-end solution or simply do not have the time and resources to train their IT personnel to learn and use complex systems. Instead, the common monitoring method in many such companies is user complaints to the IT manager to indicate when a problem has occurred. The idea is that someone in the organization will notice a failure and call for repairs before damage can be done. The reality, however, is that most IT managers have suffered some from of server room damage from excess heat or other physical phenomenon or simply just failure.

This is especially true for companies having multiple server rooms and that have concerns about routine access to each of these rooms. For example, most IT managers would like some form of remote access for determining the status of a server room. Additionally, concerns exist with current solutions regarding the manpower intensiveness of these solutions. Most network monitoring solutions can consume a full or part-time employee. The financial justification for these systems is, therefore, difficult because network equipment typically fails yearly or on a disaster basis, and the cost of recovery is seen as less than that of maintaining a full-time employee to routinely monitor the equipment.

Similar concerns exist for monitoring rack-mounted components such that individual components within a rack can be monitored remotely. Also, current monitoring solutions do not provide for video imaging of remote server locations over a network. Computer equipment is typically placed in server rooms for two reasons: security and environmental control. Remote video imaging of a server room over a network can provide for maintaining security of the equipment despite the lack of a physical presence on site.

A typical computer room can house hundreds of devices, ranging from expensive server grade computers to bridges, routers, uninterruptible power supplies and telephone equipment. A server room's environment requires monitoring because out of limit environmental variables can eventually affect the equipment in the room. For example, high temperatures, humidity (for example, from water leaks), or lack of airflow can detrimentally affect the equipment. Similarly, alarms, such as smoke and fire alarms, or the status of room openings, are important to determine. While the expense of replacing server room components if they fail is great, currently existing monitoring solutions are not cost effective for smaller-sized companies to implement despite the potential costs of such losses.

Monitoring systems are typically implemented as simple, stand-alone devices with which a user or application may configure and interact. Most appliances allow one or more users or applications to interact with them, but the user or application must typically interact with each appliance separately.

These typical monitoring systems use a centralized application (either an extension to a Network Management System, such as HP OpenView, or a proprietary server or console application). While these mechanisms can be quite effective, they introduce additional costs, through additional software, hardware, configuration, administration, and network bandwidth. Also, the central application/server often introduces a single point of failure into the environment.

Another issue with stand-alone appliances, particularly devices whose primary purpose is to monitor environmental and/or network conditions, is their vulnerability to unreported failure. Specifically, if the monitoring appliance suffers a failure, detection of the failure typically requires user interaction or polling by an expensive centralized management server. The consequence of non-detection of the failed appliance is an absence in detection of the conditions that the device was responsible for monitoring, coupled with no knowledge of the lapse in coverage.

In the case of an appliance failure, the typical stand-alone appliance lacks any mechanism for the external saving and restoring of data, specifically configuration and historical data. This can add significant overhead and opportunity for errors when a failed device is replaced, as the new device will need to be successfully reconfigured to match the failed device. Mechanisms for saving and restoring configurations for a device on external servers can be implemented, but once again introduces the problem of additional cost and points of failure.

Beyond the application to server rooms and rack mountings of network equipment, various other monitoring systems suffer from the same failures and deficiencies associated with network bandwidth and undetected sensor failure. Further, these monitoring systems may suffer from lost historical data associated with the failure of a sensor.

As such, many typical remote monitoring systems suffer from deficiencies caused by undetected sensor failure and limited communications bandwidth. Many other problems and disadvantages of the prior art will become apparent to one skilled in the art after comparing such prior art with the present invention as described herein.

SUMMARY OF THE INVENTION

Aspects of the invention are found in a network-enabled appliance or device. The device may have one or more sensors. These sensors may, for example, measure environmental variables, power-related variables, video or still-images, sounds, or network variables, among others. Further, the network-enabled appliance may send data, alerts, alarms, and/or other notifications associated with the sensors and the measured data.

In addition, the network-enabled appliance may be connected to an interconnected network. Through the interconnected network, the network-enabled appliance may communicate with other network-enabled appliance and/or one or more remote monitoring systems.

The network-enabled appliance may also send data, alarms, and other notifications through various communications means. These means may include telephone networks, modems, pager networks, other wireless communications means, auditory means, visual means, web-based means, and others.

A further aspect of the invention may be found in a method of communicating between network-enabled appliances. A network-enabled appliance may establish a relationship with a peer network-enabled appliance. The network-enabled appliance may then ping the peer appliance. If the peer appliance does not receive one or more consecutive pings, the peer appliance may determine the state of operability of the network-enabled appliance. In the event of a failure, the peer appliance may send an alert to a remote monitoring facility, a responsible party, or another peer appliance.

The communication may use various protocols including, for example, HTTP, SNMP, TCP/IP, FTP, LDAP, SOAP, UDP, IBM MQSeries messages, and mechanisms including, for example, HTTP POST, CIM events, DMI alerts, database inserts, and log file appends, among others. However, other protocols may be developed or envisaged.

In using a ping method in conjunction with notification when a specified state is measured, the system can monitor a multitude of conditions in a remote location and detect the failure of devices while limiting the bandwidth used for communicating the measurements. As such a remote monitoring system may be established between a cluster of remote network-enabled appliances and facilities at a separate location.

Another aspect of the invention may be found in a cluster of network-enabled appliance. The cluster of network-enabled appliances may establish various peer-to-peer relationships. Further, the cluster of appliance may establish a directory of appliances and their associated capabilities, features, and/or functions. With this directory, the cluster of appliances may share resources. In this manner, the cluster may perform more complex functions. Further, the cluster may perform the function of a failed appliance.

A further aspect of the invention may be found in a remote monitoring system. The remote monitoring system may include one or more network-enabled appliance connected to an interconnected network. Further, a remote system may monitor the one or more network-enabled appliance. Alternately, the remote system may communicate with a single dominant network-enabled appliance. This dominant network-enabled appliance may act as an intermediary between the remote system and other network-enabled appliances within the cluster. Further, the dominant network-enabled appliance may maintain a directory of the capabilities of the other network-enabled appliances within the cluster.

In addition a backup to the dominant network-enabled appliance may act as a peer observing the dominant network-enabled appliance. In the event that the dominant network-enabled appliance fails, the backup appliance may function as the intermediary and/or maintain the directory.

Another aspects of the invention may be found in a computer or machine-readable medium with an instruction set for performing the method of communication. The medium may take various forms including a CD-ROM, CD-R, CD-RW, DVD, hard drive, floppy disk, removable medium and others.

As such, an apparatus and method for monitoring remote locations are described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 11A is a block flow diagram of an exemplary method for use by the system as seen in FIG. 2.

FIG. 11B is a block flow diagram of an exemplary method for use by the system as seen in FIG. 2.

FIG. 12 is a schematic block diagram of another exemplary embodiment of the system as seen in FIG. 1.

Corresponding reference numerals indicate corresponding parts throughout the several views of the drawings.

DETAILED DESCRIPTION OF THE PREFERRED EMBODIMENT

Figure 1:
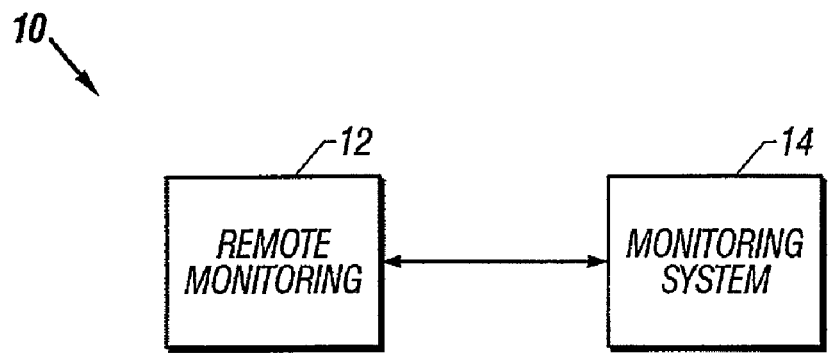
FIG. 1 is a schematic block diagram of a system for remote monitoring, according to the invention.

FIG. 1 is a schematic block diagram of the system according to the invention. The system 10 may have a remote monitoring system 12 and a monitoring system 14. Further, the system may have multiple remote monitoring systems 12 connected to one monitoring system 14. Likewise, one remote monitoring system 12 may be connected to a plurality of monitoring systems 14. As such, a remote monitoring system 12 may collect data from multiple monitoring systems 14. Alternately, a monitoring system 14 may send data to a multiplicity of remote monitoring systems 12. Further, a plurality of remote monitoring systems 12 may be connected to a plurality of monitoring systems 14 or in various other combinations.

The remote monitoring system 12 may take various forms. These forms may include a remotely located computer or complex of computers, a phone, a smart phone, an email-enabled phone, a pager, a handheld device, and/or an alarm system, among others. Further, the remote monitoring system 12 may access, monitor, and/or communicate with the monitoring system 14 through various means. These means may include email, web interfaces, pager interfaces, various networking standards, and others.

The monitoring system 14 may take various forms. These forms may include one or more network-enabled devices associated with one or more sensors. Further, the network-enabled devices may be in communication with other network-enabled appliance. The one or more sensors associated with the network-enabled devices may take various forms. These forms may include temperature sensors, pressure sensors, airflow sensors, voltage sensors, current sensors, microphones, cameras, video cameras, network sensors, infrared sensors, motion sensors, and door sensors, among others.

The remote monitoring system 12 and the monitoring system 14 may communicate through various means. These means may include, where appropriate, global networks, wide area networks, local area networks, phone lines, wireless networks, and others. Further, the remote monitoring system 12 and the monitoring system 14 may communicate using various protocols. These protocols may include TCP/IP, Ethernet protocols, SNMP, HTTP, FTP, SOAP, UDP, and IBM MQSeries messages, among others.

The system as seen in FIG. 1 may have various uses. For example, in one exemplary embodiment, the system may be used to monitor a location in which servers and other computers are stored. As such, the user can monitor network assets from remote locations. However, many other embodiments are envisioned. Various other applications may be envisaged. These applications may include military, security, and others.

Figure 2:
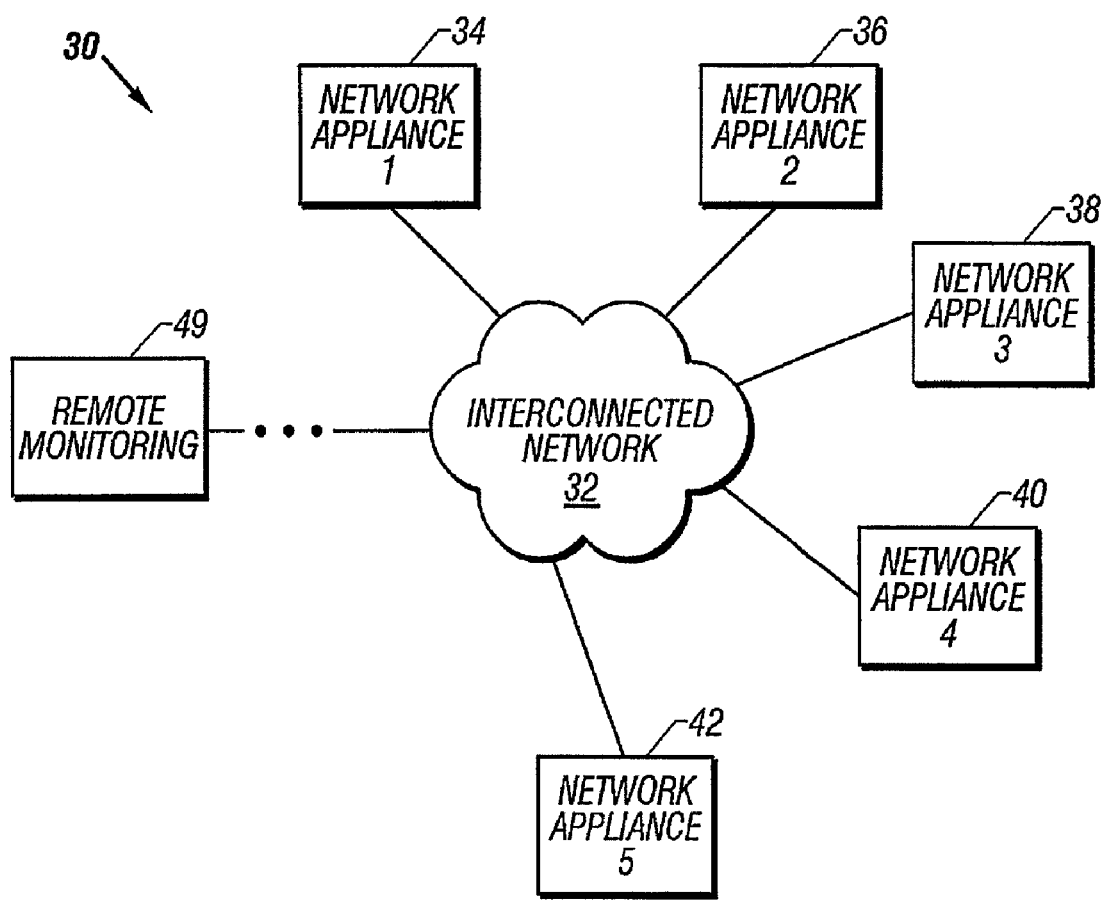
FIG. 2 is a schematic block diagram of an exemplary embodiment of a system for remote monitoring according to the system as seen in FIG. 1.

FIG. 2 is a schematic block diagram of an exemplary embodiment of the system as seen in FIG. 1. The system 30 has various network appliances connected to an interconnected network. This interconnected network may be connected to the remote monitoring system through various means. The network appliances may communicate with peer network appliances through the interconnected network 32. Further, one or more of the network appliances may be in communication with the remote monitoring system 44. This communication may be through the interconnected network 32 or through other means.

The interconnected network 32 may take various forms. These forms may include a global network, wide-area network (WAN), local area network (LAN), and wireless network, among others. Further, various protocols may be used in communicating between appliances. These protocols may include SNMP, HTTP, FTP, TCP/IP, SOAP, UDP, Ethernet protocols, and Bluetooth protocols, among others.

The remote monitoring system 44 may communicate with one or more of the network appliances through the interconnected network or through various other means. These other means may include wireless means and other networking means. For example, these means may include a global network, a dedicated connection, a phone system, a pager system, a modem and a wireless phone system, among others. For example, the network appliances may send data through an interconnected network using an HTTP POST method or an FTP method. Alternately, the network appliances may send a text pager message to a responsible party notifying them of an alarm condition. In another example, the system may make phone calls to responsible parties.

A network appliance may take various forms. In one exemplary embodiment, the network appliance is a device that can perform a well-defined set of functions and which is connected to a network. The device may include software to monitor, configure, control and communicate the results of its functions. Further, the device may be connected to an interconnected network. The device may also be configured, monitored and controlled from a remote location.

A grouping of network appliances may function as a cluster. In this case, a cluster refers to a collection of the interconnected network appliances that may act as a single logical entity. The cluster may be associated in a logical theme or be grouped to facilitate user interaction, among others. This clustering or grouping as a single logical entity may take various forms. These forms may include clustering devices associated with a specific location, a room, a building, a user, a function, a purpose, a network region, a group of users, a responsible party, a remote monitoring location, and/or a servicer, among others.

In one exemplary embodiment, the network appliances may be used to monitor a server room or location. Each network appliance may serve a specific function, monitor a specific variable, or sense an output or environmental state, among others.

For example, one network appliance may be established to monitor environmental conditions such as airflow and temperature. Another network appliance may take the form of a camera. Still further, a network appliance may monitor the state and quality of the network. In a further example, a network appliance may be used to monitor the availability and quality of electrical power. In one embodiment, one or more of these various network appliances may be located throughout a room. For example, several temperature monitors may be placed in various points in a room to acquire data associated with the temperature profile of the room. In another example, several network appliances may be placed in a server rack to monitor airflow, temperature profiles, and electrical quality within and around the rack. In this case, the network appliances may communicate with each other or communicate with a remote monitoring system. In this manner, data associated with the location, may be transferred to the remote monitoring system.

Further, these network appliances may be configured to have alarm settings. The appliance, once an alarm condition is achieved, may send an alert, either to other network appliances or to the remote monitoring system. In this manner, a complex behavior may be established such that when an alarm condition is achieved by one network appliance, other network appliances send their information to the remote monitoring system or respond accordingly. In one exemplary embodiment, a door sensor network appliance may be used to monitor entry to the server room or entry into the server rack. Once the alarm condition is achieved or once the door is opened, the door sensor network appliance may send a message or an alert to the other network appliances. The other network appliances may respond by sending further information to the remote monitoring system or by performing some other function. For example, once the door sensor network appliance is activated, or an alarm condition is achieved, the door sensor network appliance may send a message to a camera network appliance. The camera network appliance may take a picture of the person entering the door and the network appliance may then send that picture to the remote monitoring system or alternately may send the picture to another network appliance. The other network appliance may function to send the information or alert a user through another system such as a phone system, a pager, or through a modem.

Figure 3:
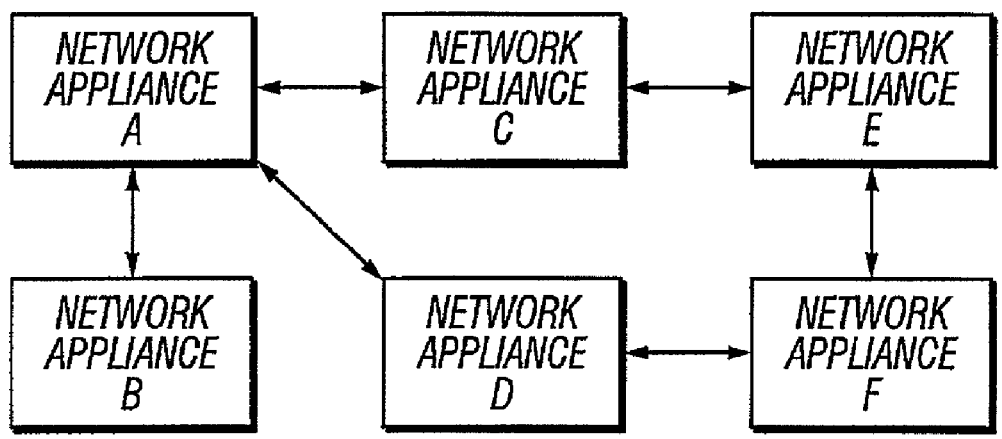
FIG. 3 is a schematic block diagram of an exemplary embodiment of the system as seen in FIG. 1.

The complex behavior may be achieved through peer-to-peer network appliance communications. FIG. 3 is schematic block diagram depicting an exemplary embodiment of a network appliance communication. According to the invention as seen in FIG. 1. For example, a set of network appliances may be connected to an interconnected network. These appliances may establish communication links between the various network appliances.

In one exemplary embodiment, a network appliance will periodically ping a peer appliance. If the peer appliance does not receive an expected ping, it may establish that the pinging appliance is inoperable. In this manner, failure of an appliance may be quickly detected.

Further, once a failure is detected by the peer appliance, the peer appliance may notify the remote monitoring location or another network appliance of the failure of the first network appliance. With this information, the other network appliances may compensate for the failure, and/or take-on the functionality of the failed device, among others. Similarly, the remote monitoring location and/or a responsible party may respond appropriately.

In one exemplary algorithm, a network appliance may be assigned to monitor several other network appliances. A network appliance may be configured to ping a multiple of other network appliances and receive pings from another set of network appliances. A network appliance may ping those that are pinging it and others that are not pinging it, or be configured to ping only those that are not pinging it. As such, various algorithms may be established that facilitate peer-to-peer failure detection.

The peer-to-peer communication system may also be used to send alert messages through the network. The review system may also be used to send data, establish various configurations of the system, create complex behaviors and establish a communication with a remote network, among others.

In one exemplary embodiment, a network appliance A may be monitoring a network appliance B, C and D. As such, network appliances B, C and D may ping network appliance A. Alternately, network appliance A may ping network appliances B, C and D.

If network appliance A should fail, be shut down or be removed from the system, devices B, C and D may learn of the device failure or shutdown. For example, if device B were to ping device A and not receive a response, device B may establish that device A is no longer in service. Alternately, if device A were periodically to ping to device C, and the periodic pinging were to cease, device C may establish that device A was no longer in service. In another instance, device A may send a special ping to notify of an impending shutdown event or an expected shutdown event. As such, device B, C, and D may establish that device A is no longer in service. Devices B, C, or D may send notification to the remote monitoring system of the failure or shutdown of device A. In a further example, device B, C, and D may communicate such that only one device sends the failure notice.

Figure 4:
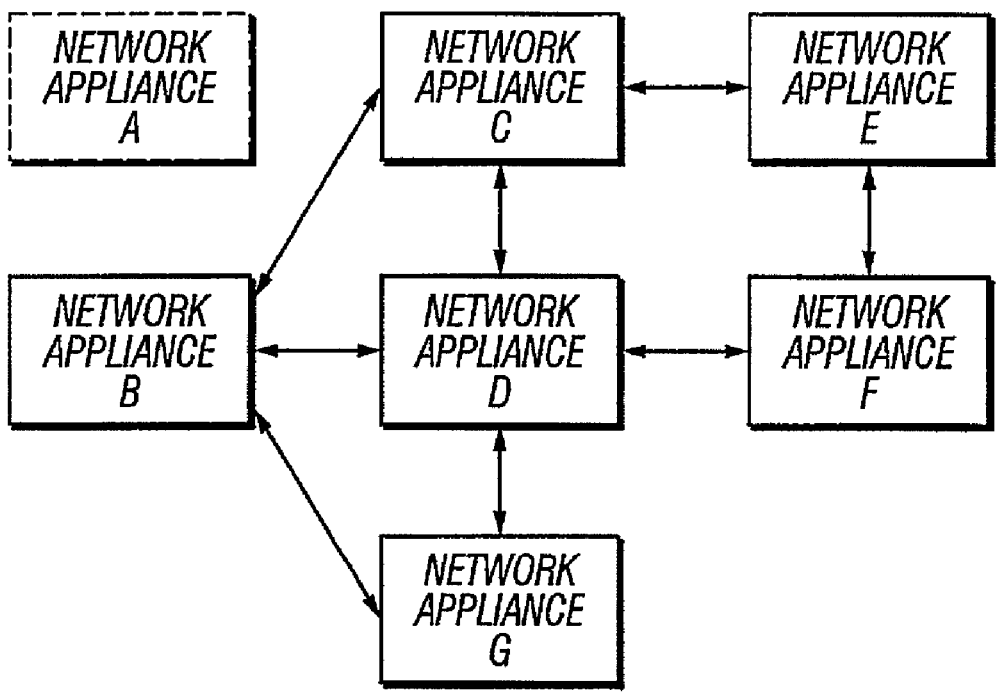
FIG. 4 is schematic block diagram of another exemplary embodiment of the system as seen in FIG. 1.

Further, device B, C, and D may establish new communication links and a new peer-to-peer review relationship, as seen in FIG. 4. For example, appliance B may communicate with appliance C instead of appliance A. Because appliance D no longer requires the resources to monitor appliance A, it may establish a new monitoring of device C. In this manner, the peer-to-peer review may be automatically reconfigured.

In another exemplary embodiment, a new appliance G may be added to the system and/or linked to the network. Device G may establish a peer-to-peer review with appliance B. Further, it may attempt to establish a peer-to-peer review with device D. In one exemplary embodiment, device D may have the option of refusing the peer-to-peer review based on D's resources, the number of peers that D is already monitoring or being monitored by, and/or other factors. As such, G may then establish a peer-to-peer review relationship with network appliance F. Further, appliances may decide to end the peer-to-peer review. For example, network appliance D may decide to end its review of appliance F. This decision may be based on the appliance's capabilities, the number of other peer-to-peer review relationships, network resources or other factors. Alternately, network appliance F may decide to end its peer-to-peer review relationship with D. This decision may be made for similar reasons.

As such, peer-to-peer relationships may be automatically reconfigured, may be used to monitor the state of various other peer-to-peer appliances, may be used to transfer data between appliances and to establish complex behaviors across appliances, among others.

Peer-to-peer review process may use various protocols to establish communication. These protocols may include FTP, SNMP, HTTP, SOAP, UDP, and TCP/IP, among others.

Figure 5:
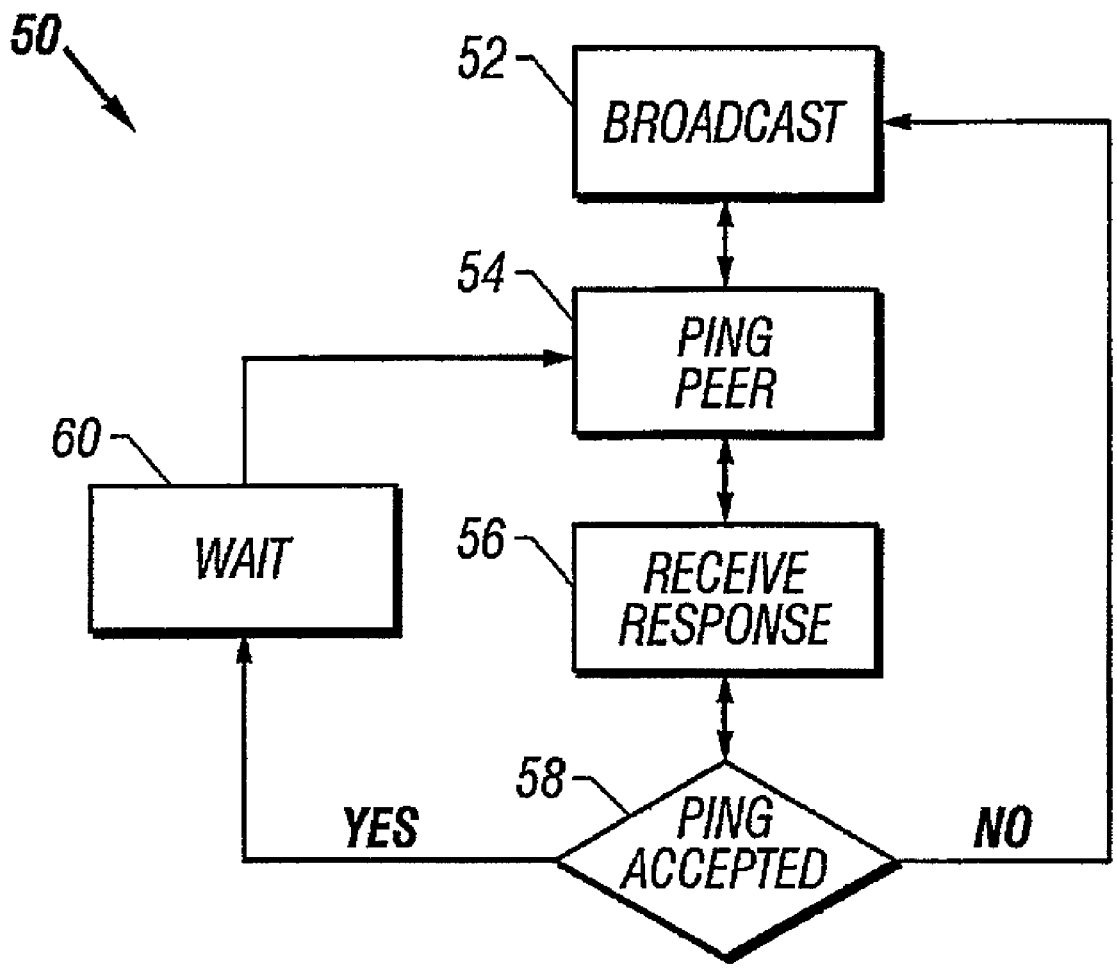
FIG. 5 is a block flow diagram of an exemplary method for use by the system as seen in FIG. 1.

FIG. 5 is a block flow diagram of an exemplary method for establishing communication for the peer-to-peer review process. The method 50 may be performed by a network appliance. The network appliance may broadcast to find other network appliances on the network as seen in block 52. However, the appliance may employ one or more of a variety of mechanisms to determine the presence of other appliances. For example, the mechanisms may include end-user configuration, multicasting, subnet broadcasting, directory service queries, and subnet address walking, among others.

The network appliance may then ping and/or poll one of the other network appliances found on the network, as seen in the block 54. This ping may take various forms. For example, the ping may use the protocol of an HTTP POST message. The ping may include information such as, for example, the serial number of the requesting appliance, the planned period of time before a next ping, the IP address and hostname of the requesting appliance, and a list of SNMP target addresses for SNMP traps. However, the ping may take various forms including, for example, HTTP, SOAP, SNMP, TCP, UDP, FTP, and IBM MQSeries messages, among others.

The peer device may receive the ping, determine whether it has the resources to establish a peer-to-peer review process and send a response. That response may be received by the network appliance, as seen in a block 56. The response message may include various data. This data may include data similar to the data above and/or may be associated with the functionality of the location of the device, the address of the device, a desired periodicity of future pings, and acceptance of the relationship, among others. The response may use various protocols including those listed above, among others.

If the peer device accepts the peer-to-peer relationship, the network appliance may wait a given period as established in a communication between the network appliance and its peer, as seen in a block 60. Then, a network appliance may ping the peer again, as seen in a block 54. The peer device may decide whether a message needs to be sent back in response. As such, peer-to-peer review is established.

In one exemplary embodiment, a network-enabled appliance may broadcast across an interconnected network to find address of peer appliances. For example, the network-enabled appliance may send a subnet broadcast. Peer appliances may respond to this broadcast. The network-enabled appliance may then selectively ping one of the responding peer appliances. The network-enabled appliance may for example use an HTTP POST message or an FTP message with information regarding the address of the peer appliance and/or the periodicity of future pings. In addition, the message may contain information about the functionality of the network-enabled appliance, and/or information associated with the algorithms associated with the functionality of the network-enabled appliance. The peer appliance may respond with a message. The message may, for example, use an HTTP Post, FTP, and/or SNMP message, among others. The message may include information associated with acceptance of the peer relationship, the periodicity of future pings, and/or the functionality of the peer device, among others. The network-enabled appliance may then selectively periodically ping the peer appliance.

In one exemplary embodiment, an appliance may, optionally, only "ping" appliances that it is configured to watch and which are not currently "pinging" it. Since a peer appliance is pinging the network appliance periodically, the absence of pings from the appliance can be used to detect its failure. If an appliance is intentionally shutdown, the appliance may issue a special "ping" to each of the devices "pinging" it and/or being "pinged" by it to indicate its plan to shutdown. This may be used to prevent those devices from reporting a planned shutdown or restart as a failure.

In any case, an appliance may be found to have failed if a) a "ping" from the appliance is significantly overdue, or b) one or more attempts to "ping" the appliance fail. When a failure is detected, e-mail addresses or other contact mechanisms supplied by the appliance may be notified. Additionally, SNMP traps (with their agent address set to the IP address of the missing appliance) may be sent to the target SNMP addresses supplied by the appliance. Optionally, the notifications may also be sent to the e-mail and SNMP addresses associated with the failure-detecting appliance (particularly if the failed appliance did not supply this data).

With this algorithm, a network-enabled appliance may establish a peer review relationship with other network-enabled appliance. Further, the network-enabled appliance may selectively establish more than one peer review relationships. In addition, an algorithm may dictate the establishment of a number of peer-to-peer relationships.

In this manner, if a peer device is expecting a periodic ping from a network appliance, it may periodically establish the operational state of the network appliance. If a ping is not received, or a series of pings is not received, the peer device may establish that the network appliance is not operating.

A variation of the peer-to-peer ping may be used for an appliance to home communication. For example, each appliance may be configured to "ping" one or more host web servers. In this case, the appliance does not detect or report outages of the targeted servers, but an application on those servers uses the information reported through the ping to know when to report an appliance outage and to whom to report the outage.

Other embodiments of these mechanisms may use various protocols for "ping" implementation including HTTPS, SOAP, SNMP Traps, proprietary TCP or UDP implementations, and IBM MQSeries messages, among others, as well as other alarm notification mechanisms including HTTP POSTs, CIM Events, DMI Alerts, database INSERTs, and log file append, among others.

The network appliances may communication with the remote monitoring system through various methods. These methods may include a pager network, telephone network, wireless network, global interconnected network, and dedicated line, among others.

In an exemplary embodiment, a periodic message may use an HTTP POST method. Similarly other communications between appliances and between appliances and the remote location may use an HTTP POST method. The method may take a form similar to the following.

POST/message_type HTTP/1.1

Host: 000.000.0.000:00

User-Agent: Software/version

Accept: */*

Accept-Encoding: gzip

Accept-Language: en

VARIABLE=1% VARIABLE2=2% VARIABLE3=value

The variables may contain information associated with the network appliance type, software version, network ID, hostname, devices, sensors, and other data.

In another exemplary embodiment, messages may be sent using an FTP method. As such, a message may take the form of a text file placed on another appliance or server and appear as:

VARIABLE1=1
VARIABLE2=2
VARIABLE3=value

These methods may also be used to transfer image, sound, and other data. In addition, other methods, mechanisms, and protocols may be used to send, transfer, and/or post data.

Figure 6:
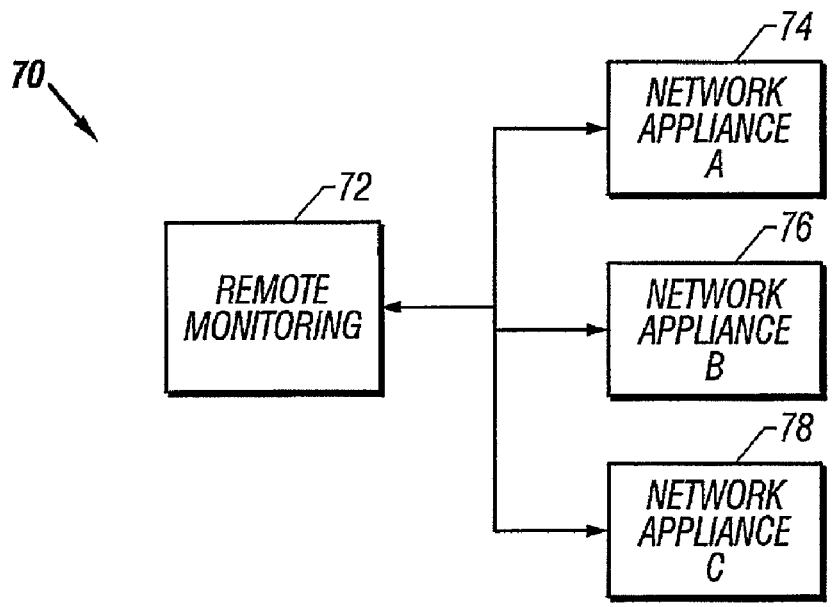
FIG. 6 is a schematic block diagram of another exemplary embodiment of the system as seen in FIG. 1.

FIG. 6 is a schematic block diagram of an exemplary embodiment of a system for communicating between the remote monitoring system 72 and network appliances 74, 76, and 78. The system 70 may establish communication between the remote monitoring system 72 and each of the network appliances A, B and C, 74, 76, and 78, respectively. The remote monitoring system 72 may poll each of the devices. Alternately, each of the devices 74, 76, and 78 may relay information to the remote monitoring system 72.

The communication between the remote monitoring system and the network appliances may take various forms. These forms may include those listed above, among others.

Further, the remote monitoring system 72 and network appliances 74, 76, and 78 may communicate through various protocols. These protocols may include HTTP, FTP, SNMP, SOAP, UDP, TCP/IP, and others.

Figure 7:
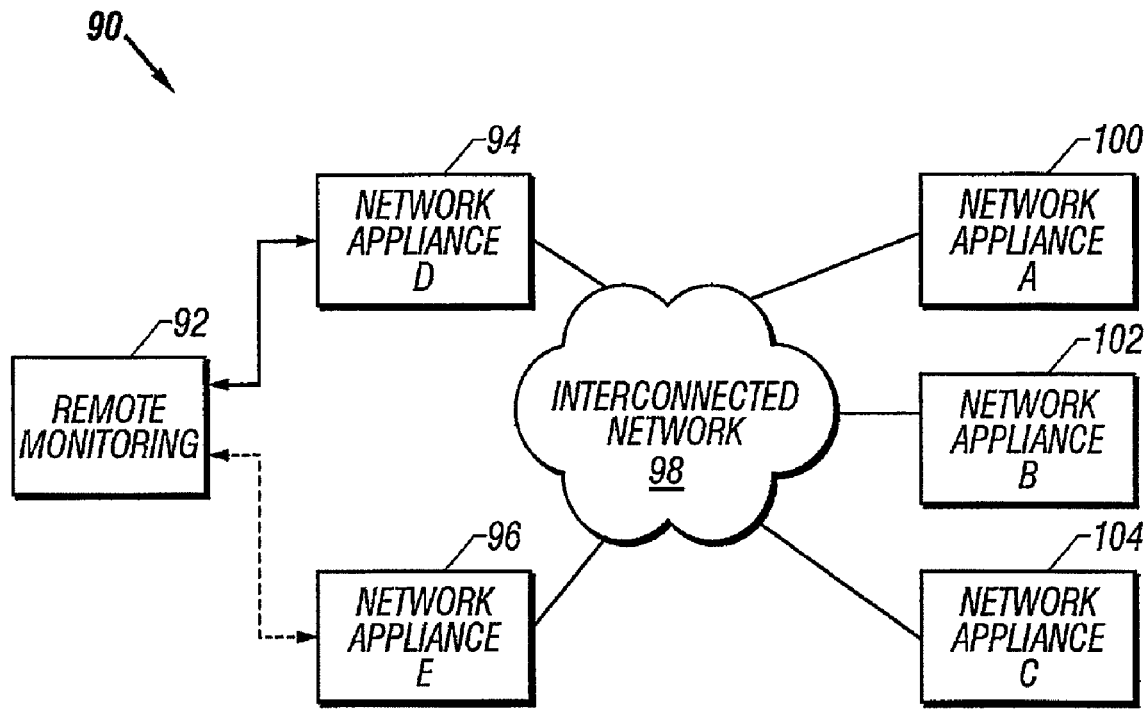
FIG. 7 is a schematic block diagram of another exemplary embodiment of the system as seen in FIG. 1.

In an alternate embodiment, remote monitoring system may be configured to communicate with one, two, or less than all of the network appliances. FIG. 7 is schematic block diagram of an exemplary embodiment of a system for communicating between the remote monitoring system 92 and a cluster of network appliances. The system 90 may include a set of network appliances 94, 96, 100, 102, and 104, connected to an interconnected network 98. The remote monitoring system 92 may be connected to one or more of the network appliances 94 and 96. However, the remote monitoring system may or may not be connected to the interconnected network 98 connecting each of the appliances 94, 96, 100, 102, and 104.

Remote monitoring system 92 may communicate with the one or more network appliances 94 96 through various means. These means may include those listed above among others. For example, the remote monitoring system 92 may communicate with network appliance D 94 through a global network, WAN, wireless network, satellite network, dedicated connection and phone line, among others.

This method of communication between the remote monitoring system 92 and the one or more network appliances 94 and 96 in conjunction with the peer-to-peer review communications method may permit redundancy in the communications link between the network appliances connected to the interconnected network 98 and the remote monitoring system 92. For example, network appliance D 94, may, through the interconnected network 98 establish a peer-to-peer review communications with network appliance E 96. Further, the network appliances D 94, and network appliance E 96, may have a means of communications with the remote monitoring system 92. If the network appliance D 94 were to fail, the network appliance E 96 may establish communications with the remote monitoring system 92. As such, network appliances A, B and C, through the interconnected network 98, may communicate with a network appliance E 96, which in turn can communicate with the remote monitoring system 92. In this manner, network appliances A, B, and C maintain communications a link with the remote monitoring system 92.

In one exemplary embodiment, a floating IP address may be used. Network appliance D 94 may establish and take ownership of the IP address. If network appliance D 94 were to fail, network appliance E 96 could take over the IP address and establish itself as the owner. In this manner, the remote monitoring system 92 would maintain communications with the appliances connected to the interconnected network 98 without reconfiguration. In an alternate embodiment, network appliance E 96 may send a message to remote monitoring system 92 indicating the change in the operation status of network appliance D 94. Further, the network appliance E 96 may send a message to remote monitoring system 92 establishing itself as the owner of the communications link to network appliances A, B and C.

In another exemplary embodiment, network appliance D 94 and network appliance E 96 may use differing communication means to reach a remote monitoring system 92. For example, network appliance D 94 may be connected to a global network. In the event of D's failure, network appliance E 96 may have a modem that may call the remote monitoring system 92. Still further, network appliance D 94 and network appliance E 96 may be connected to the remote monitoring system 92 via the same means, but use differing protocols in their communication with remote monitoring system 92. For example, network appliance D 94 may use an HTTP POST protocol to communicate with the remote monitoring system 92 and network appliance E 96 may use an FTP protocol.

Figures 8, 9:
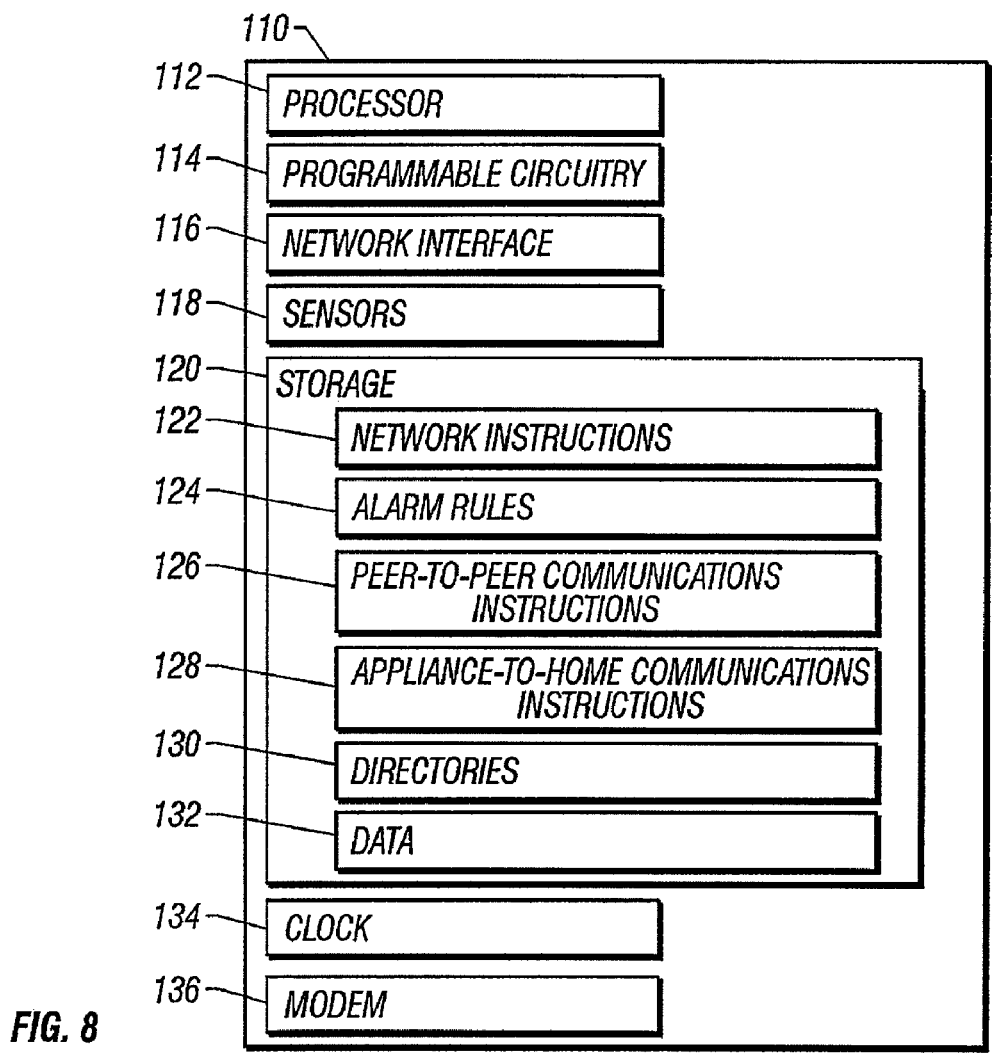
FIG. 8 is a block diagram of an exemplary embodiment of the network appliance for use in the system as seen in FIG. 1.
FIG. 9 is a diagram depicting an exemplary embodiment of a directory for use in the system as seen in FIG. 1.

FIG. 8 is a block diagram of an exemplary embodiment of a network appliance according to FIGS. 1 and 2. A network appliance 110 may have a processor 112, a programmable circuitry 114, a network interface 116, sensors 118, storage 120, clock 134, and a modem 136. However, the network appliance 110 may have all, some or none of these features. Further, the network appliance may use various items in varying combinations to enable varying functionality.

The processor 112 may take various forms. These forms may include microprocessors and other circuitries. The processor 112 may take various operating instructions and/or data and use this information in conjunction with the programmable circuitry 114, the network interface 116, sensors 118, one or more storage mediums 120, a clock 134, a modem 136, and others, to enable the functionality of the network appliance and further establish communications with peer appliances and/or their remote monitoring system. Further, the processor 112 may be functional to operate with a Java-based operating system. In addition, the processor 112, in conjunction with the operating system, may function as a server and/or a web-based server.

The programmable circuitry 114 may take various forms. These forms may accept programming from various means including keyboards, graphic user interface devices, hand-held devices, across the network interface and others. In this manner, the functionality of the network appliance may be adapted.

The network interface 116 may take various forms. These forms may include Ethernet, wireless Ethernet, Token rings, Bluetooth communications means, and modem and phone line, among various other networks and communications interfaces. Furthermore, the network appliance 110 may have more than one network interface connected to similar or differing communications means. For example, one appliance may have a connection to a private Ethernet network and an interface connection to a wide area network. Alternately, another appliance may have a network interface connection to a private Ethernet network and a wireless Ethernet interface. As such, various appliances may have functionality associated with the network interfaces 116. For example, a network appliance with both a private Ethernet network interface and a wireless interface may communicate with wireless sensors and communicate the sensor data to other appliances on the private network. In another example, an appliance may have both a private Ethernet network interface and a WAN interface. As such, the appliance may function to communicate information from and to appliances on the private network to and form remote locations. However, various combinations and functionalities associated with one or more, similar or varying network interfaces may be envisaged.

Further, the sensors 118 may take various forms. These forms may include temperature sensors, pressure sensors, electric quality sensors, airflow sensors, microphones, cameras, video cameras, infrared cameras, door sensors, motion sensors, and network sensors, among others. One or more sensors 118 may be included in the network appliance. Alternately, the network appliance may not have a sensor 118. In another embodiment, the network appliance may have an audio speaker or visual output. Moreover, the sensor or sensors 118 may or may not be encompassed within the network appliance 110. As such, the sensor or sensors 118 may be integrated in the network appliance 110 or external to the appliance. Further an external sensor may be connected exclusively to the appliance 110, such as, for example, an external temperature sensor, a motion detector, or other sensor connected through a dry-contact cable, among others. Alternately, the sensor or sensors 118 may be external to the appliance 110 but connected to more than one appliance 110, such as, for example, a UPS with multiple dry contact terminals, among others. Furthermore, the sensor or sensors 118 may be external to the appliance with a wireless connection that may or may not be monitored by one or more appliances in a cluster of appliances, such as, for example, a wireless temperature sensor, a network device monitored through SNMP, and others. Individual sensors that can be monitored by more than one appliance are subject to the load balancing among appliances, dynamic allocation between appliances, and appliance fail-over coverage.

The storage medium 120 may take various forms. These may include RAM, ROM, Flash memory, hard drives, floppy drives, removable drives, DVD, CD, and memory sticks, among others. The storage medium may hold various operational instructions, data and other information. This information may include networking and communications instructions 122, alarm and alert rules 124, peer-to-peer communication instructions 126, appliance to home communication instructions 128, various directories 130, and data 132, among others.

The network and communications instruction 126 may include implementations of various protocols, operating instructions for network interfaces 116 and/or modems 136, and other instructions for communications. Further, the storage medium 120 may hold instruction sets for interpreting messages sent in various protocols. These instruction sets may be written as a CGI, Java servlet, ASP, JSP, or PHP script, among others. Further, these instruction sets may enable the network appliance to function as a wed-based server. For example, the instruction sets may be used to parse HTTP POST messages, receive FTP messages, and/or interpret messages sent using other protocols, methods, and mechanisms.

The storage medium 120 may also have alarm rules 124 and other algorithms, thresholds, and setpoints. These may be used to indicate values of parameters at which notification is desired by a responsible party.

In addition, the storage medium 120 may have peer-to-peer 126 and appliance-to-home 128 communications instructions. These instructions, for example, may direct the communication and communication methods for various purposes with peer appliances and/or remote locations.

Further, directories 130 and other data 132 may be held in the storage medium. The directory 130 may contain information associated with appliances, addresses, hostnames, software, software versions, device types, device data, and others. Further, the directory may be shared or may be a replica of a shared directory. The data 132 may or may not be communal, shared, and distributed. The data 132 may, for example, be values of sensors, lists such as SNMP trap targets, email notification lists, phone and pager numbers, and others.

In addition, a network appliance may have a clock 134. This clock 134 may take various forms, including analog, digital, and other. The clock 134 may be used in conjunction with the sensors to establish a time at which a measurement is taken.

Further, the network appliance 110 may have a modem 136 or other communication means for connecting across a phone line or other wired or wireless communications means. This may or may not be similar to the network interface 116.

In one exemplary embodiment, the network appliance may function to measure temperature at a point in a server room. The network appliance may, for example, have a processor 112, a programmable circuitry 114, a network interface 116, a temperature sensor 118 and various storage mediums 120. The network appliance may function to take periodic temperature measurements. Further, the network appliance may periodically ping one or more peer appliance to establish a cluster behavior. Further, the network appliance may function to deliver temperature data periodically or on request to either a peer appliance or to the remote monitoring system.

In an alternate embodiment, the network appliance may have a processor 112, a programmable circuitry 114, a network interface 116 and a modem 136. The network appliance may use the networking interface to establish peer-to-peer communications with other appliances on the system. Further, upon alert from another appliance on the system, a network appliance may activate the modem and establish a new communications link with a remote monitoring system. Alternately, the modem may be used to send pages, make phone calls, or perform other communications functionality to alert a responsible party as to the condition of a peer appliance.

One exemplary method of establishing complex interactive behavior between network appliances such as the activation of the modem in response to an alert in a peer appliance is to use a device directory. FIG. 9 is a block diagram of an exemplary embodiment of a device directory. A device directory may hold a device identification, information as to the supported activities of each device associated with the device identification, and various other data associated with the device and/or its functionality.

The device directory may be established through various means. These means may include a broadcasting and/or pinging of other devices found on the interconnected network. Peer devices may communicate with each other information associated with those devices, the supported activities of those devices, and the data associated with the device and supported activity.

These communications and the directory may have various data. These data may include network addresses of appliance, hostname, appliance model, appliance software version, appliance devices and sensors, functionality and/or capabilities of appliances, algorithms, setpoints, tasks, among others. Further the data may include information about the appliance devices and sensors including, for example, local device IDs, device types, device label, device location, and various device-type specific attributes. The network appliance may also be programmed to report its data to directories on other devices upon restart, shutdown, and other events.

Further, network appliances may be programmed to support queries for returning attributes and attributes of supported devices. The network appliances may be programmed to make queries of other appliances. In addition, the appliances may support device and appliance ID validation to allow for the detection of stale references to deleted devices.

The directory structure may enable network appliances to monitor devices and sensors on other network appliances and/or peer appliances. As such, a network appliance may act in response to the value of a variable on another appliance. For example, a camera enabled network appliance may monitor a door sensor on another network appliance. Further, the camera enabled network appliance may send, post, or transfer an image in response to the opening of the door.

Alternately, a network appliance may direct the behavior of another device. For example, using the directory an appliance may determine the address of another appliance with email capabilities and direct the sending of a message through that other appliance.

In another example, a door sensor threshold may be defined on an appliance, and offer the option of a multi-selection list of door sensors on different appliances registered with the directory, as well as a multi-selection list of cameras on various appliances. The resulting threshold would allow for a door-open on any of the door sensors to result in the generation by the appliance of e-mail with pictures captured from one or more different cameras.

In a further example, a panel for configuring email content for sensor alerts could offer an add/remove style pair of list boxes to allow control of the addition of the current values of various sensors from various appliances in the email.

In another example, a temperature sensor threshold may be defined on an appliance, and offer the option of a multi-selection list of temperature sensors on various appliances. As a result, a single threshold definition would be applied to these multiple sensors, and only a single stream of SNMP alerts and/or emails would be generated, in contrast with many messages from the appliances with the temperature sensors. Notification emails may include the current values of all the selected sensors, as well as an indication as to whether a given sensor was in error or not.

To support these activities, each appliance may support a HTTP POST based interface for querying the current values of multiple attributes. The interface may query by device unique ID. For cameras and other special sensors, a HTTP POST based interface may be used to return images, streaming data, sound streams, or other data types.

Further, an HTTP POST based configuration interface may allow for the definition of thresholds on the appliance that would notify the configuring appliance when a violation occurred. Appliances may support multiple instances of these thresholds per attribute. In addition, an HTTP POST based threshold violation notification mechanism may be used to notify the threshold's remote owner of the violation.

Also, an HTTP POST based interface may allow appliances to validate the thresholds remotely configured on the appliance. This may be accomplished by querying the appliance which set the threshold if the threshold is still valid. Appliances may use this interface whenever there was a lapse in availability, such as a network outage or a reset of the appliance.

Further, an HTTP POST based interface may allow querying of the status of thresholds remotely configured on the appliance, to allow synchronization between the appliance that configured the thresholds and the appliance which implements them. The querying may be used, for example, following a restart or a network outage.

In addition, an HTTP POST based interface may be used for setting the output values for output devices. These devices may also support a current value query interface.

While the HTTP POST based interface has been used for exemplary purposes, various other interfaces can be envisaged that perform various functionalities. These interfaces may use other protocols including FTP, SNMP, CIM, SOAP, proprietary UDP or TCP, or LDAP, among others.

By allowing the specification of more than one directory appliance/service, a measure of fault tolerance is achieved. To help with fault recovery, directory appliances may be common to all members of a set of appliances, and may be configured to know of each other. When a directory service appliance is activated, it may attempt to contact one of its peers, and request a list of all appliances known by the peers. This list may be used to update the list of appliances known by the directory appliance and, in turn, used to request each of those appliances to republish their data to the appliance. Appliances which are successfully contacted but refuse to republish may be discarded.

In order to support security, each directory appliance may support the option of configuring an access user-ID and password, which may be configured on each appliance that attempts to join and use the directory. For added security, passwords unique to each appliance that attempts to use the directory may be required. Other embodiments may support any of a variety of security servers (LDAP, Kerberos, DCE, NIS) or mechanisms (digital signatures, public-private key encryption).

In an alternate embodiment, a single network appliance may establish a master directory. The master directory network appliance may poll other appliances found on the network and receive information which may be stored in the directory.

Another means of fault tolerance with the directory appliances may be to implement an IP address based fail-over between the primary and secondary directory appliances. In this way, all appliances would only refer to and interact with a single directory appliance. The implementation of this may involve each of the directory appliances having a distinct IP address, with one of them (at a given moment) also having the IP address assigned to the directory appliance. The primary directory appliance may, by default, have the IP address of the directory appliance and its own distinct IP address. The secondary appliance may possess a distinct IP address. Any updates to the primary appliance may be communicated immediately to the secondary appliance, to maintain synchronization. Meanwhile, the secondary appliance may regularly poll the primary in order to watch for a failure. If a failure occurred, the secondary appliance may, for example, activate the directory service IP address on itself, send gratuitous ARP resolves to the network to force any ARP caches on the network to recognize the new location of the IP address, and assume the roll of primary directory appliance. When replaced or serviced, the former primary directory appliance may contact the new primary, synchronize directory data, and assume the roll of secondary directory appliance.

Figure 10A:
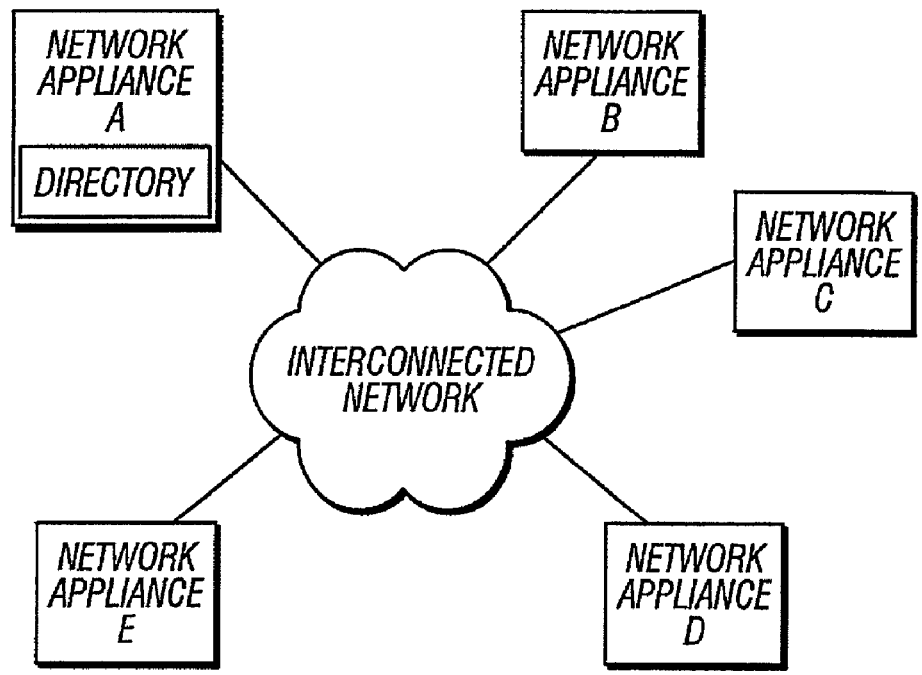
FIG. 10A is a schematic block diagram of an exemplary embodiment of the system as seen in FIG. 1.

FIG. 10A shows a network appliance A with a directory. Network appliances B, C, D and E communicate with network appliance A to establish the directory. These appliances may communicate with the network appliance A through the interconnected network.

Still further, network appliance may poll the network appliance with the master directory to locate resources owned by other network appliances. In this manner, a network appliance may enhance its own functionality by using features and functionality of other network appliances. For example, network appliance B may sense an environmental variable. However, B may not have the capability of sending email through a global network. Network appliance C may not sense environmental variables. However, it may have a connection to a global network. As such, network appliance B can query the directory of network appliance A to learn of the global connection of network appliance C. Network appliance B may then communicate with network appliance C to establish an external link.

In an even more complex exemplary embodiment, network appliance B may sense an environmental variable. Network appliance B may not have image functionality or connection to an external network. As such, network appliance B, upon establishing alarm condition or other condition, for example, may query network appliance A and the directory on network appliance A. Network appliance B may then learn of the resources of network appliance E, D and C. As such, network appliance B may, for example, communicate with a camera based network appliance E. Network appliance E may then send an image through network appliance C through the external network. In this manner, increasingly complex behaviors may be established using the cluster while maintaining the autonomy of the various network appliances. Even further, the directory may be stored on various network appliances.

Figure 10B:
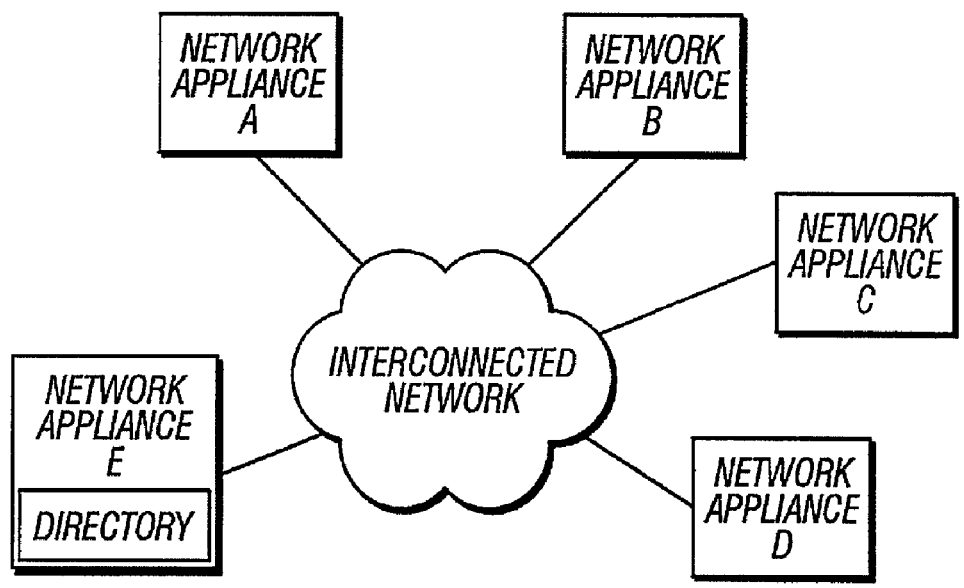
FIG. 10B is a schematic block diagram of an exemplary embodiment of the system as seen in FIG. 1.

As seen in FIG. 10B, the directory may reside in network appliance E. For example, E may have established a peer communications with network appliance A. Upon failure or shutdown of network appliance A, E may have established the need for a new directory. As such, E may have acquired the directory from A, or E may repoll and rebroadcast to discover the device's supported activities and various data associated with those devices and supported activities from the other network appliances connected to the interconnected network. Another method for facilitating the transfer of the directory and any other data required by the cluster as a whole or by various devices within the cluster, may need to establish a master list and a slave list.

FIG. 11A is block flow diagram of an exemplary method for building a directory. In the method 140, a network appliance may determine the location of a directory, as seen in a block 142. The directory may be stored on another network appliance. Alternately, the directory may be stored on a server.

In a next block 144, the network appliance may notify the directory device and direct the storage of information associated with the network appliance. This information may include address, resources, sensors, responsibilities, unique identifiers, data, peer relationship data, and responsible parties, among others. Further, the information may include configuration parameters.

In an alternate method, the directory device may initiate contact with the network appliance and request information for storage in a database. FIG. 11B is a block flow diagram of an exemplary method for building a directory. The directory device may locate the network appliance, as seen in a block 146. The directory device may use various means such as address walking, an SNMP trap, querying appliances at known address, acquire peer addresses from known appliances, and others.

As seen in a next block 147, the directory device may request data from the network appliance. The data may include address, resources, sensors, responsibilities, unique identifiers, data, peer relationship data, and responsible parties, among others. Further, the information may include configuration parameters. Then, the directory device may adjust the directory accordingly, as seen in a block 148.

The directory device may take the form of a network appliance. Alternately, the directory device may take the form of a server. Furthermore, the directory device may take the form of a network appliance with access to a database residing on a server. As such, the directory may be stored on the network appliance, on a server, or network drive, among others.

In a general exemplary embodiment, as seen in FIG. 12, a network appliance A may have a master data A. Network appliance B may be in peer-to-peer communication with network appliance A and may establish a slave data set associated with the master dataset A. This may, for example, be a master and slave directory, or it may take the form of other data mutually useful by A or B or by other appliances on the network. In addition, B may hold the master list (master data B) storing various other information. Further, network appliance C may store slave data for B and, in further redundancy, may store slave data for A. However, the network appliance need not store any slave data nor a master list as seen by network appliance D.

Furthermore, one or more servers may or may not be connected to the network. Data may be stored on these servers. The data may take the form of a directory, a master data, or a slave data, among others. As such, the server and data may take various forms. These forms may include, for example, files on a files server, a database on a database server, and an LDAP server, among others. One or more of the network appliances attached to the interconnected network may be clients of the one or more servers.

In this manner, complex behavior may further take advantage of communal data. For example, a responsible party may desire an email upon a given temperature condition. If one or more temperature sensors exist in the room, an alert rule and the associated pager number or email address or other data may be stored in a community accessible master data list. The information may further be stored by each of the temperature sensor devices as a slave-data set. As such, when the temperature condition is met, the notification may be sent to the responsible party. The temperature sensing device at which the condition is met may chose to poll the master data list to determine how, where or what to do with the information. Alternately, the network appliance may use the slave data list or data set to determine its behavior.

In this manner, redundancy of community accessible information has enabled. Further a user may change the desired information in one location and have that information become universal.

Further a remote monitoring fail-over and load balancing may be implemented. A number of the features implemented by monitoring appliances may be based on the observation through the network of other device, especially through protocols such as SNMP, CIM, and HTTP. In the presence of multiple appliances, the choice of which appliances monitor which network devices may be associated with the capabilities and capacities of the individual appliances. This fact can be used as the basis for both dynamic allocation of device monitoring tasks and a mechanism for fail-over of monitoring responsibilities if an appliance fails. In addition load balancing, fail-over monitoring, and dynamic allocation may be applied to the monitoring of shared sensors.

Figure 13:
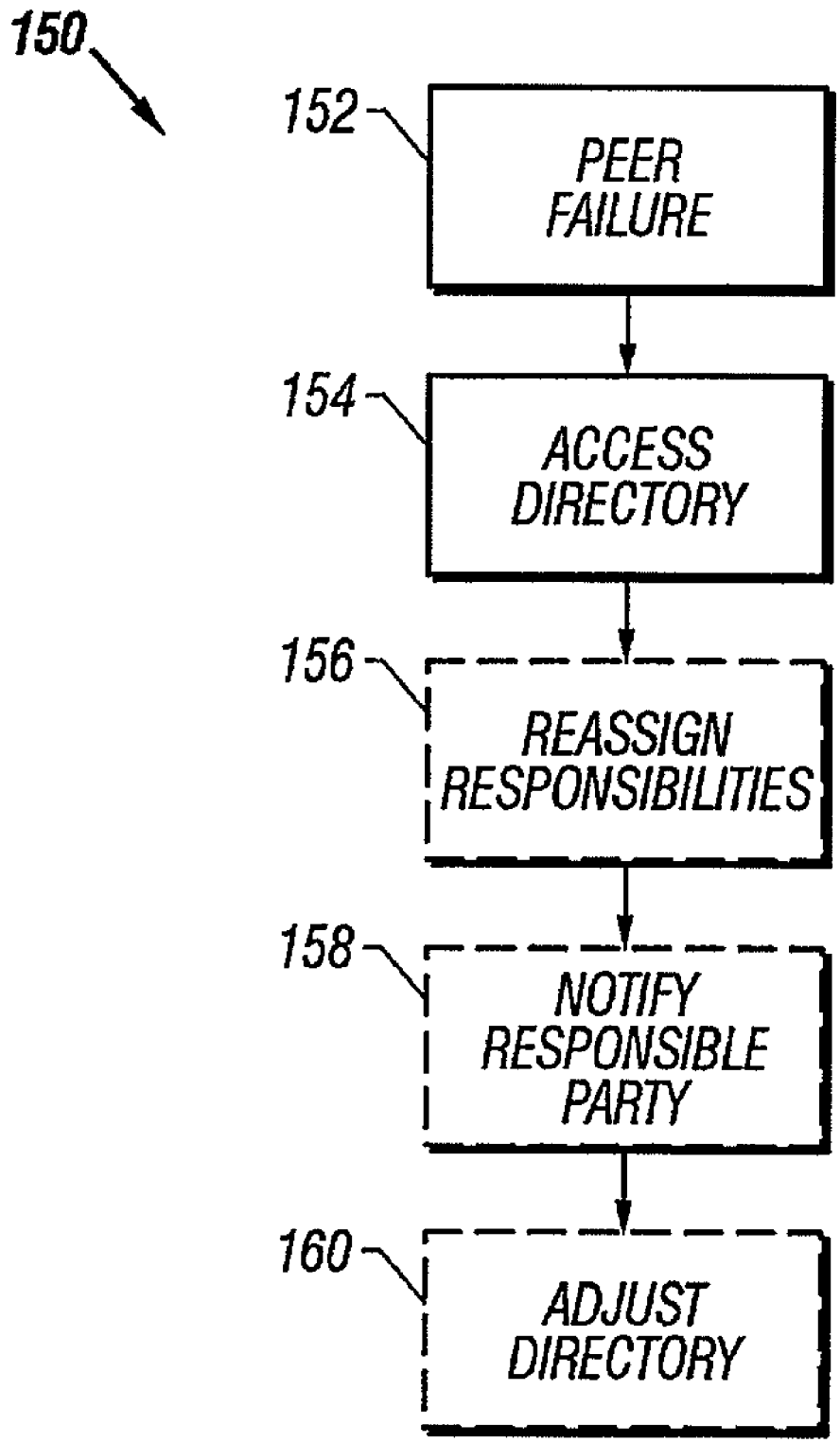
FIG. 13 is a block flow diagram of an exemplary method for use by the system as seen in FIG. 2.

In an exemplary method 150 as seen in FIG. 13, responsibilities and/or resources may be reallocated. For example, in the event that a peer device fails, as seen in a block 152, a network appliance may access the directory to determine what resources, responsibilities, and contacts are assigned to the failed device.

The resources may for example be data management, capabilities, functions, and sensors, among others. The failure of a device may diminish the capabilities of a cluster. Alternately, devices relying on the capabilities and functionality of the failed appliance may be informed of the failure. In this manner, appliances relying on the failed appliance may determine, through accessing the directory or other means, whether and how to access an alternate device, notify a responsible party of the loss of capability, and/or establish peer relationships, among other. For example, a device with a modem, may act as a means of paging responsible parties. If this device were to fail, the cluster may loose paging capabilities. Further, peer devices would loose a peer relationship. As such, the cluster would need to find an alternate device with paging capability or an alternate means of communicating, for example, alarms. Furthermore, new peer relationships may be established. However, various examples of resources may be envisaged.

The responsibilities may include monitoring of shared sensors, directory or back-up directory service, data storage service, peer relationships, and alarm monitoring, among others. The network appliance monitoring the failed appliance may reassign the responsibilities. For example, the appliance may poll other appliances to request acceptance of the responsibility. The other appliances may, for example, be found in the directory. For example, the appliance may access the directory to determine which other appliances are capable of communicating with a shared wireless sensor. The appliance may then assign or request acceptance of the responsibility from the other appliance, as seen in a block 156.

Further, the appliance may notify responsible parties of the peer's failure, as seen in a block 158. The appliance may access, for example, the directory to determine who the responsible parties are and how to contact them.

Moreover, the network appliance may adjust the directory, as seen in a block 160. The adjustment may reflect the failure of the appliance, deletion of the appliance, reassignment of responsibilities, and actions taken in response to the failure, among others.

These steps may be performed in various combinations or not at all. Furthermore, various other methods may be envisaged for reallocation of resources, dynamic allocation of responsibilities, and notification of responsible parties. In addition, the method 150 may be performed by a device prior to a planned shutdown or deactivation.

In one example, each appliance in a set of appliances registered with a given set of directory appliances (an "appliance domain") may publish a set of records in the directory describing its capabilities for remote monitoring. Specifically, a record may be defined for each type of remote monitoring containing the quantity of devices that can be supported, the number of devices currently being monitored, the version of implementation of the remote monitoring, and other monitoring-type-specific attributes. Each record may be keyed, for example, by the combination of the appliance's serial number and the type of remote monitoring.

The contents of this capability directory will be used by both configuration tools (to determine what remote monitoring capability is available and if any additional capacity is available) and for responding to failures (since the directory will aid in determining what other devices are capable of being assigned work from failed appliances.)

Appliances registered in a given appliance domain may define the configuration for any remote monitoring as a set of directory records. Each such record may include the type of remote monitoring, the address and identity of the device to be monitored, the appliance serial number of the appliance currently monitoring the device, and any monitoring-type-specific settings.

In one example, when a new device is configured for monitoring, a new record may be added to the configuration directory with no initial appliance assigned. The configuration tool may then query the capability directory for any appliances with the required monitoring capability and the capacity to monitor additional devices. The resulting list of appliances may then be sorted, based on such priorities as subnet locality to the device, available capacity, and monitoring function level. The configuration tool may then traverse the sorted list, sending requests to each appliance to accept ownership of the monitoring responsibility for the device until an appliance accepts ownership. The accepting appliance may set itself as the monitoring appliance for the device.

When an appliance fails, the peer appliance detecting the outage may query the configuration directory for any records owned by the failed device. If any are found, it may request that the record be set to un-owned (serial number=0) and may repeat the same allocation algorithm used for initial configuration until a new owner is found. If an appliance is being shutdown or is being removed from the appliance domain, it may repeat this same procedure on its own behalf, assigning its responsibilities to other devices. Furthermore, these methods of reallocation may be applied to monitoring responsibility for shared sensors.

A number of other configuration elements may provide significant benefit if defined in a shared fashion in the directory of the appliance domain. Specifically, shared objects for such things as user accounts and privileges, e-mail notification templates, action response profiles, e-mail notification lists, and SNMP trap target lists would provide benefit.

To provide an efficient mechanism for these objects, the directory client and server implementation may be enhanced to provide and support a configuration subscription mechanism with local, persistent caching of directory records. Specifically, each appliance that has an interest in a given shared object may subscribe to that object on the directory server. This may result in the appliance receiving an initial copy of the record, as well as automatically receiving updates to that record when the "master" is updated. By doing so, the appliance may then be able to use the data without repeatedly requesting the information from the directory server, as well as being able to operate with the cached copy of the data if a network outage or directory server outage occurs. The subscriber list for each directory record may be stored persistently with the record on the directory server, so that an appliance that has been offline can be automatically brought up-to-date when contact is made with the directory server.

Shared configuration objects may be published as named records to the directory server, and may consist of a domain-unique ID, label, type, and list of object-type-specific attribute/value pairs.

Shared objects may include user accounts, email notification lists, SNMP trap notification lists, email notification templates, and action response profiles, among others. User Accounts may simplify the management of access control for a group of appliances, by allowing single user-id/password for all appliances and a way to apply access control to new appliances added to the group. Accounts may support access control lists for accessing specific appliances, devices attached to those appliances, and other shared objects.

E-mail notification lists may allow administration of shared notification lists, so that the various notification actions configured on different appliances can be tailored without the need to interact with each appliance directly. Configuration attributes which refer to e-mail addresses may support both explicit e-mail addresses and symbolic references to shared e-mail notification lists.

SNMP trap notification lists, as with e-mail, where SNMP trap targets are specified may support explicit target lists and symbolic references to shared SNMP notification lists.

E-mail notification templates may be user-definable "form letters" for e-mail alarm notifications, allowing the user to indicate what text to send and supporting macros for embedding various attributes of the appliance and its devices and sensors. Allowing multiple appliances to share these definitions may provide simple and consistent tailoring of these notifications across many appliances.

Action response profiles may define a set of responses, including repeated actions and escalation, to alert conditions detected through thresholds or other means. Many customers with multiple appliances may allow these responses to be consistent and easily updated across their appliances.

Figure 14:
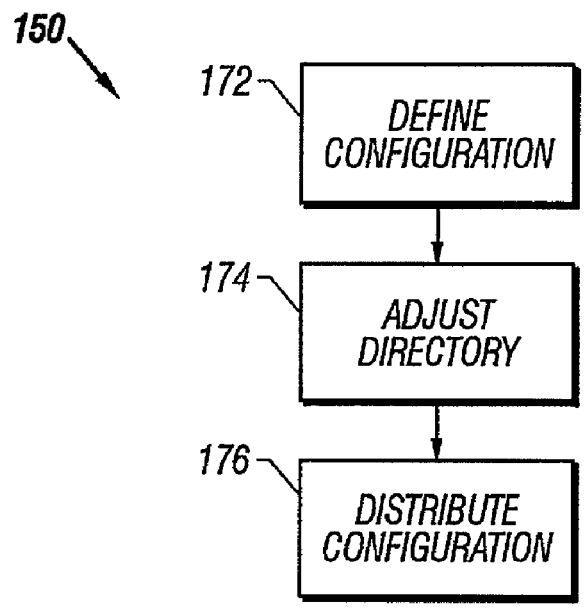
FIG. 14 is a block flow diagram of an exemplary method for use by the system as seen in FIG. 2.

The shared objects and directory resources, among others, may be used to enable bulk configuration of devices. In a method 170 as seen in FIG. 14, a user may define a configuration that is to be applied to multiple devices, as seen in a block 172. The configuration may include action response profiles, email notification templates, SNMP trap notification lists, email notification lists, and shared configuration objects, among others.

The user may then access the directory or other storage device and store the configuration, as seen in a block 174. For example the user may access the directory device, proxy device, or primary appliance, among others.

Next, the configuration may be distributed as seen in a block 176. The distribution may be accomplished by polling appliances to which the configuration is assigned, transferring the data to the appliance upon request from the appliance, and other methods.

Figure 15:
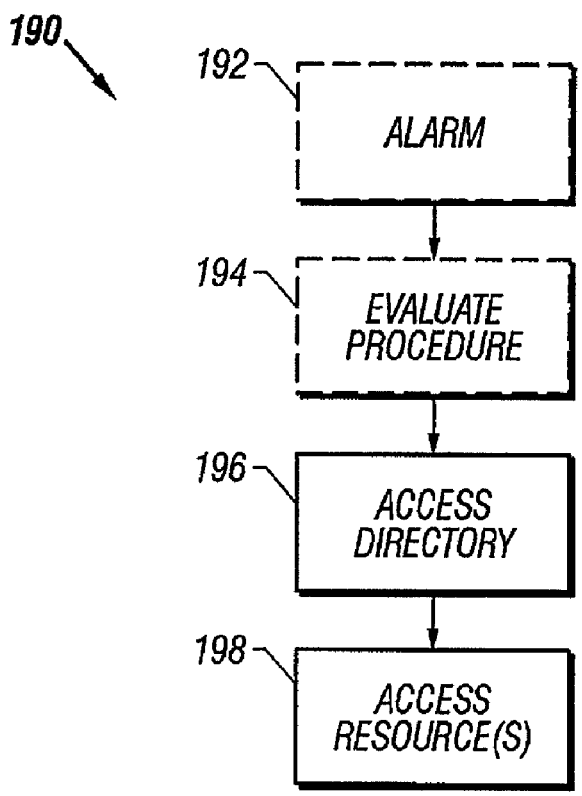
FIG. 15 is a block flow diagram of an exemplary method for use by the system as seen in FIG. 2.

Furthermore, the shared objects and directory resources, among others, may be used to build complex appliance behavior. For example, as seen in FIG. 15, a method may be established for using shared resources. As seen in method 190, an appliance may enter an alarm state, as seen in a block 192. However, this step may or may not be included in the method 190.

The appliance may evaluate an established procedure, as seen in a block 194. The established procedure may be instructions to notify a responsible party, direct the behavior of another device, or notify another appliance, among others. However, this step may or may not be included in the method 190.

The appliance may access the directory as seen in a block 196. A such, the appliance may determine the address of other appliances with desired resources. For example, a door alarm appliance may access the directory to determine the address of a camera appliance. Alternately, a temperature sensor appliance may access the directory to determine the address of a paging enabled appliance. Furthermore, the appliance may access the directory for notification lists, methods, and other shared objects.

The appliance may access resources on other appliances as seen in a block 198. For example, the door alarm appliance may access images on the camera appliance. Alternately, the door alarm appliance may direct the camera appliance to send an image to a responsible party. In another example, a temperature sensor appliance may direct a pager-enabled appliance to send a page to a responsible part. However, various examples of complex behavior may be envisaged.

Further, to support a single, fault-tolerant interface for configuration and application GUIs to interact with the appliance domain as a single unit, support for one or more "floating" IP addresses (similar to the fail-over mechanism described for the directory server) may be implemented. This may allow one of the appliances in the appliance domain to possess a given additional IP address intended for access by external parties (i.e. web browsers, Java applications, etc). As with the directory server, one or more backup appliances on the same subnet may be configured, so that a failure in the primary appliance may result in one of the backup appliances "claiming" the public IP address, allowing uninterrupted service.

Besides supporting public IP address fail-over, the appliances may support proxy of requests to other appliances in the domain. For example, requests to access configuration data or sensor data on a given appliance could either be done by directly interacting with the appliance, or issuing a request through the appliance owning the public IP address. Proxy access may be by appliance serial number, so that DHCP or other unannounced IP address reassignment can be supported. Allowing proxy access may also allow better support for accessing through firewalls (since only the public IP address would need to be "opened"). Support of proxy requests may, in general, use shared user accounts, since the security context of the requesting application would need to be equally meaningful to all appliances in the domain.

As such, a monitoring system is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A method of peer-to-peer review between first and second network appliances, the first and second network appliances being connected to an interconnected network, the method comprising:
   determining the address of the second network appliance using the first network appliance, the address of the second network appliance being associated with the interconnected network;
   sending a ping message to the second network appliance from the first network appliance through the interconnected network;
   selectively responding to the ping message from the first network appliance using the second network appliance;
   establishing a periodicity between the sending of subsequent periodic ping messages based at least in part on information provided to the first network appliance by the second network appliance; and
   sending subsequent ping messages from the first network appliance to the second network appliance through the interconnected network at time intervals based at least in part on the established periodicity,
   wherein selectively responding to the ping message includes determining that the second network appliance has adequate resources to establish a peer-to-peer review process.

2. The method according to claim 1, wherein sending the ping message comprises performing an HTTP POST method.

3. The method according to claim 1, wherein sending the ping message comprises performing an FTP method.

4. The method according to claim 1, the method further comprising sending a notification message in the event that an expected periodic ping is not received.

5. The method according to claim 4, wherein the notification message is sent to a remote location.

6. The method according to claim 4, wherein the notification message is sent to another network appliance connected to the interconnected network.

7. A computer readable medium having stored thereon sequences of instruction including instructions that will cause a processor to:
  determine an address of a second network appliance using a first network appliance, the address of the second network appliance being associated with an interconnected network;
  send a ping message to the second network appliance from the first network appliance through the interconnected network;
  selectively respond, as a function of a number of active peer-to-peer review relationships in which the second network appliance is engaged, to the ping message from the first network appliance using the second network appliance;
  establish a periodicity between the sending of subsequent periodic ping messages based at least in part on information provided to the first network appliance by the second network appliance; and
  send subsequent ping messages from the first network appliance to the second network appliance through the interconnected network at time intervals based at least in part on the established periodicity.

8. A network appliance configured to operate in a peer-to-peer review relationship, the network appliance comprising:
  a processor;
  a network interface coupled to the processor, the network interface connected to an interconnected network; and
  a storage medium coupled to the processor, the storage medium including an instruction set for implementing a peer-to-peer review relationship with at least one other network appliance, the instruction set including instructions that will to cause the processor to:
    determine an address of the at least one other network appliance, the address of the at least one other network appliance being associated with the interconnect network;
    send a ping message to the at least one other network appliance through the interconnected network;
    establish a periodicity between the sending of subsequent periodic ping messages based at least in part on information provided by the at least one other network appliance; and
    send subsequent periodic ping messages to the at least one other network appliance through the interconnected network at time intervals based at least in part on the establish periodicity,
  wherein the information provided by the at least one other network appliance includes a number of active peer-to-peer review relationships in which the at least one other network appliance is engaged.

9. The network appliance according to claim 8, wherein the instructions will cause the processor to send the ping message using an HTTP POST method.

10. The network appliance according to claim 8, wherein the instructions will cause the processor to send the ping message using an FTP method.

11. The network appliance according to claim 8, wherein the processor is a Java-based processor.

12. The network appliance according to claim 8, wherein the network appliance further comprises at least one sensor coupled to the processor.

13. The network appliance according to claim 12, wherein the storage medium further comprises at least one threshold associated with at least one variable measured by the at least one sensor.

14. The network appliance according to claim 13, wherein the storage medium further comprises an instruction set that will cause the processor to send a notification in response to the at least one threshold being met by the at least one variable measured by the at least one sensor.

15. A cluster of network appliances comprising:
  a plurality of network appliances being grouped according to a characteristic, each of the plurality of network appliances being connected to an interconnected network, at least one first network appliance of the plurality of network appliances being operable to communicate with a remote system,
  wherein each network appliance of the plurality of network appliances is operable to establish at least one peer-to-peer review relationship with at least one other network appliance of the plurality of network appliances, the at least one peer-to-peer relationship being based at least in part on a number of active peer-to-peer relationships in which the at least one other network appliance is engaged, and
  wherein the plurality of network appliances is operable to act as a logical entity.

16. The cluster according to claim 15, wherein the characteristic is at least one of location, responsible user, purpose, network region or responsible party.

17. The cluster according to claim 15, wherein the at least one first network appliance of the plurality of network appliances acts as an intermediary between the remote system and the plurality of network appliances.

18. The cluster according to claim 17, further comprising:
  a second network appliance of the plurality of network appliances, the second network appliance being coupled to a sensor and engaged in a peer-to-peer review relationship with the first network appliance of the plurality of network appliances;
  a third network appliance of the plurality of network appliances, the third network appliance being coupled to the sensor and engaged in a peer-to-peer review relationship with the first network appliance of the plurality of network appliances,
  wherein the first network appliance of the plurality of network appliances is configured to gather sensor information from the sensor by requesting the sensor information from the third network appliance of the plurality of network appliances in the event that the second network appliance fails.

19. The cluster according to claim 17, further comprising at least one second network appliance of the plurality of network appliances, the at least one second network appliance of the plurality of network appliances being operable to communicate with the remote system and engaged in a peer-to-peer review relationship with the at least one first network appliance of the plurality of network appliances.

20. The cluster according to claim 18, wherein the at least one second network appliance of the plurality of network appliances assumes a network address of the at least one first network appliance of the plurality of network appliances in the event that the at least one first network appliance of the plurality of network appliances fails.

* * * * *